United States Patent
Hendry et al.

(10) Patent No.: US 10,148,983 B2
(45) Date of Patent: Dec. 4, 2018

(54) METHODS AND SYSTEMS OF IMPROVED VIDEO STREAM SWITCHING AND RANDOM ACCESS

(71) Applicant: QUALCOMM Incorporated, San Diego, CA (US)

(72) Inventors: Fnu Hendry, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 15/266,824

(22) Filed: Sep. 15, 2016

(65) Prior Publication Data

US 2017/0094302 A1    Mar. 30, 2017

Related U.S. Application Data

(60) Provisional application No. 62/233,223, filed on Sep. 25, 2015.

(51) Int. Cl.
*H04N 19/503*    (2014.01)
*H04N 19/114*    (2014.01)
(Continued)

(52) U.S. Cl.
CPC ... *H04N 21/234327* (2013.01); *H04N 19/187* (2014.11); *H04N 19/31* (2014.11);
(Continued)

(58) Field of Classification Search
None
See application file for complete search history.

(56) References Cited

U.S. PATENT DOCUMENTS

2014/0044195 A1    2/2014    Komiya et al.

OTHER PUBLICATIONS

Schierl et al. "System Layer Integration of High Efficiency Video Coding," IEEE Transactions on Circuits and Systems for Video Technology, IEEE Service Center, Piscataway, NJ, US, vol. 22, No. 12, Dec. 1, 2012, pp. 1871-1884, XP011487157, ISSN: 1051-8215, DOI: 10.1109/TCSVT.2012.2223054 (Year: 2012).*

(Continued)

*Primary Examiner* — Anand S Rao
*Assistant Examiner* — Tyler B Edwards
(74) *Attorney, Agent, or Firm* — Kilpatrick Townsend & Stockton, LLP

(57) ABSTRACT

Systems, methods, and computer readable media are described for providing improved video coding, including improved video stream switching and random access. In some examples, systems, methods, and computer readable media include obtaining video data at an encoder and determining, from the video data, an intra random access point (IRAP) picture. A first set of one or more leading pictures associated with the IRAP picture are coded as random access decodable leading (RADL) pictures based on the first set of one or more leading pictures having a temporal identifier (TemporalId) that is less than or equal to a TemporalId threshold value. A second set of one or more leading pictures associated with the IRAP picture are coded as random access skipped leading (RASL) pictures based on the second set of one or more leading pictures having a TemporalId that is greater than the TemporalId threshold value. The video bitstream can then be generated to include the IRAP picture, the first set of one or more leading pictures, and the second set of one or more leading pictures.

30 Claims, 9 Drawing Sheets

(51) Int. Cl.
| | |
|---|---|
| *H04N 19/196* | (2014.01) |
| *H04N 21/2343* | (2011.01) |
| *H04N 21/845* | (2011.01) |
| *H04N 19/70* | (2014.01) |
| *H04N 19/187* | (2014.01) |
| *H04N 19/31* | (2014.01) |

(52) U.S. Cl.
CPC ......... *H04N 19/70* (2014.11); *H04N 21/8451* (2013.01); *H04N 21/8455* (2013.01)

(56) References Cited

OTHER PUBLICATIONS

Sjoberg et al. "RExt HLS: Picture referencing across CRA pictures," 16. JCT-VC Meeting; Sep. 1, 2014 —Jan. 17, 2014; San Jose; Joint Collaborative Team on Video Coding of ISO/IEC JTC1/SC29/WG11 and ITO-T SG.16); No. JCTVC-PO118-v4, Jan. 15, 2014 (Jan. 15, 2014), XP030115617 (Year: 2014).*

Sjoberg et al. "Overview of HVEC high-level syntax and reference picture management," IEEE Transactions on Circuits and Systems for Video Technology, Jan. 1, 2012 (Jan. 1, 2012), pp. 1-14, XP055045360, ISSN: 1051-8215, DOI: 10.1109/TCSVT.2012.2223052 (Year: 2012).*

Fujibayashi A et al: "Random access support for HEVC", 4. JCT-VC Meeting; 95. MPEG Meeting; Jan. 20, 2011-Jan. 28, 2011; Daegu;(Joint Collaborative Team on Video Coding of ISO/IEC JTC1/SC29/WG11AND ITU-T SG.16 ); URL: http://wftp3.itu.int/av-arch/jc tvc-site/, No. JCTVC-D234, Jan. 15, 2011 (Jan. 15, 2011), XP030008274, ISSN: 0000-0013.

International Search Report and Written Opinion—PCT/US2016/052764—ISA/EPO—Dec. 7, 2016.

Schierl T., et al., "System Layer Integration of High Efficiency Video Coding," IEEE Transactions on Circuits and Systems for Video Technology, vol. 22 (12), XP011487157,Dec. 2012, pp. 1871-1884.

Sjoberg R., et al., "Overview of HEVC High-Level Syntax and Reference Picture Management", IEEE Transactions on Circuits and Systems for Video Technology, Jan. 1, 2012 (Jan. 1, 2012), XP055045360, 14 pages.

Sjoberg R., et al., "RExt HLS: Picture referencing across CRA pictures", 16th JCT-VC Meeting, Jan. 9, 2014-Jan. 17, 2014, San Jose, No. JCTVC-P0118-v415, Jan. 2014 (Jan. 15, 2014), XP030115617,Retrived from: URL: http://wftp3.itu.int/av-arch/jctvc-site/.

* cited by examiner

700

ACCESS AN ENCODED VIDEO BITSTREAM, THE ENCODED VIDEO BITSTREAM INCLUDING AN INTRA RANDOM ACCESS POINT (IRAP) PICTURE, A SET OF ONE OR MORE RANDOM ACCESS DECODABLE LEADING (RADL) PICTURES HAVING A TEMPORAL IDENTIFIER (TEMPORALID) LESS THAN OR EQUAL TO A TEMPORALID THRESHOLD VALUE, AND A SET OF ONE OR MORE RANDOM ACCESS SKIPPED LEADING (RASL) PICTURES HAVING A TEMPORALID GREATER THAN THE TEMPORALID THRESHOLD VALUE
702

DECODE THE ENCODED VIDEO BITSTREAM TO OBTAIN THE VIDEO DATA
704

FIG. 7

METHODS AND SYSTEMS OF IMPROVED VIDEO STREAM SWITCHING AND RANDOM ACCESS

CROSS-REFERENCE TO RELATED APPLICATIONS

This application claims the benefit of U.S. Provisional Application No. 62/233,223, filed Sep. 25, 2015, which is hereby incorporated by reference, in its entirety for all purposes.

FIELD

This application is related to video coding and compression. More specifically, this application relates to improved video stream switching and random access techniques that are applicable to video encoding and decoding.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high-efficiency video coding (HEVC), advanced video coding (AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

BRIEF SUMMARY

In some implementations, techniques and systems are described that provide improved video stream switching and random access. Various types of random access point pictures can be included in a video representation. For example, random access point pictures can provide points at which the video representation can be switched to from another video representation. In another example, random access point pictures can provide points at which the video representation can be randomly accessed (e.g., when access to an earlier or later point in the video representation is requested). One example of random access point pictures include intra random access point (IRAP) pictures, which may include instantaneous decoding refresh (IDR) pictures, clean random access (CRA) pictures, and broken link access (BLA) pictures. IDR pictures follow a closed group of picture (GOP) structure, while CRA pictures follow an open GOP structure. BLA pictures can result from splicing of bitstreams at locations of CRA pictures.

A leading picture is a picture that follows an associated IRAP picture in decoding order but that is output earlier than the IRAP picture. Leading pictures may include random access skipped leading (RASL) and random access decodable leading (RADL). RASL pictures are leading pictures that use pictures that precede the IRAP picture both in decoding order and output order as reference for inter-prediction. RADL pictures are leading pictures that do not use pictures that precede the IRAP picture both in decoding and output order as reference for inter-prediction. Both RASL pictures and RADL pictures can be used in the open GOP structure. However, in the closed GOP structure, only RADL pictures are used. This difference allows the leading pictures in the open GOP case to be coded more efficiently than in the closed GOP case due to more reference pictures being available for predicting the leading pictures. Furthermore, a constraint exists that requires RASL pictures of an IRAP picture to precede all RADL pictures of the IRAP picture in output order.

In adaptive streaming systems that allow switching between different representations of video content (e.g., a first representation of video content at a low quality and a second representation of the same video content at a higher quality), a closed GOP structure may typically be used so that consecutive pictures are not dropped before output when random access occurs. For example, if an adaptive streaming system used an open GOP structure with RASL pictures, the constraint that RASL pictures precede RADL pictures would lead the system to drop the consecutive RASL pictures (consecutive in output order according to the constraint) when the switch is performed at an associated IRAP picture. The RASL pictures would be dropped because they may use pictures that precede the IRAP picture both in decoding and output order as reference for inter-prediction, and these reference pictures are not available due to the stream switching or random access being performed at the IRAP picture.

In some examples, techniques and systems are described herein that define leading pictures associated with an open GOP IRAP picture (e.g., a CRA picture) as RASL pictures or RADL pictures based on temporal identifiers (TemporalId) of the pictures. For example, leading pictures associated with the IRAP picture and with a TemporalId up to a particular value are coded as RADL pictures, while the other leading pictures associated with the IRAP picture (with TemporalId greater than that particular value) are coded as RASL pictures.

In some examples, a new type of IRAP picture is defined, in which case all subsequent pictures in decoding order with a TemporalId up to a particular value do not depend on pictures earlier than the IRAP picture in decoding order (and consequently can be correctly decoded without referring to pictures earlier than the IRAP picture in decoding order), while all subsequent pictures in decoding order with TemporalId greater than that particular value may depend on pictures earlier than the IRAP picture in decoding order (and consequently may not be correctly decoded without referring to pictures earlier than the IRAP picture in decoding order).

According to at least one example, a method of encoding video data to generate a video bitstream is provided that comprises obtaining video data at an encoder, and determining, from the video data, an intra random access point (IRAP) picture. The method further comprises coding a first set of one or more leading pictures associated with the IRAP picture as random access decodable leading (RADL) pictures. The first set of one or more leading pictures are coded as one or more RADL pictures based on the first set of one or more leading pictures having a temporal identifier (TemporalId) less than or equal to a TemporalId threshold value. The method further comprises coding a second set of one or more leading pictures associated with the IRAP picture as random access skipped leading (RASL) pictures. The second set of one or more leading pictures are coded as one or more RASL pictures based on the second set of one or more leading pictures having a TemporalId greater than the TemporalId threshold value. The method further comprises generating the video bitstream, the video bitstream including the IRAP picture, the first set of one or more leading pictures, and the second set of one or more leading pictures.

In another example, an apparatus is provided that includes a memory configured to store video data and a processor. The processor is configured to and can obtain video data at an encoder. The processor is further configured to and can determine, from the video data, an intra random access point (IRAP) picture. The processor is further configured to and can code a first set of one or more leading pictures associated with the IRAP picture as random access decodable leading (RADL) pictures. The first set of one or more leading pictures are coded as one or more RADL pictures based on the first set of one or more leading pictures having a temporal identifier (TemporalId) less than or equal to a TemporalId threshold value. The processor is further configured to and can code a second set of one or more leading pictures associated with the IRAP picture as random access skipped leading (RASL) pictures. The second set of one or more leading pictures are coded as one or more RASL pictures based on the second set of one or more leading pictures having a TemporalId greater than the TemporalId threshold value. The processor is further configured to and can generate the video bitstream, the video bitstream including the IRAP picture, the first set of one or more leading pictures, and the second set of one or more leading pictures.

In another example, a computer readable medium is provided having stored thereon instructions that when executed by a processor perform a method that includes: obtaining video data at an encoder; determining, from the video data, an intra random access point (IRAP) picture; coding a first set of one or more leading pictures associated with the IRAP picture as random access decodable leading (RADL) pictures, the first set of one or more leading pictures being coded as one or more RADL pictures based on the first set of one or more leading pictures having a temporal identifier (TemporalId) less than or equal to a TemporalId threshold value; coding a second set of one or more leading pictures associated with the IRAP picture as random access skipped leading (RASL) pictures, the second set of one or more leading pictures being coded as one or more RASL pictures based on the second set of one or more leading pictures having a TemporalId greater than the TemporalId threshold value; and generating the video bitstream, the video bitstream including the IRAP picture, the first set of one or more leading pictures, and the second set of one or more leading pictures.

In another example, an apparatus is provided that includes means for obtaining video data at an encoder, and means for determining, from the video data, an intra random access point (IRAP) picture. The apparatus further comprises means for coding a first set of one or more leading pictures associated with the IRAP picture as random access decodable leading (RADL) pictures. The first set of one or more leading pictures are coded as one or more RADL pictures based on the first set of one or more leading pictures having a temporal identifier (TemporalId) less than or equal to a TemporalId threshold value. The apparatus further comprises means for coding a second set of one or more leading pictures associated with the IRAP picture as random access skipped leading (RASL) pictures. The second set of one or more leading pictures are coded as one or more RASL pictures based on the second set of one or more leading pictures having a TemporalId greater than the TemporalId threshold value. The apparatus further comprises means for generating the video bitstream, the video bitstream including the IRAP picture, the first set of one or more leading pictures, and the second set of one or more leading pictures.

In some aspects, the IRAP picture is a clean random access (CRA) picture. In some aspects, the IRAP picture is a new random access picture not currently defined in a video coding standard.

In some aspects, the method, apparatuses, and computer readable medium described above for encoding video data may further comprise arranging the first set of one or more leading pictures and the second set of one or more leading pictures in an output order according to the TemporalId of each leading picture in the first set and the second set, the one or more RADL pictures of the first set having a lower TemporalId than the one or more RASL pictures of the second set.

In some aspects, the method, apparatuses, and computer readable medium described above for encoding video data may further comprise arranging the first set of one or more leading pictures and the second set of one or more leading pictures in an alternating output order.

In some aspects, the video data is part of a video representation. In such aspects, the one or more RASL pictures are discarded when a switch to the video representation occurs at the IRAP picture, and the video representation is output using a reduced set of one or more temporal sub-layers when the one or more RASL pictures are discarded. In some examples, the video representation is output using an increased set of temporal sub-layers when one or more trailing pictures associated with the IRAP picture are decoded.

In some aspects, the first set of one or more leading pictures having a TemporalId less than or equal to the TemporalId threshold value do not depend on pictures earlier than the IRAP picture in decoding order and are decodable without referring to the pictures earlier than the IRAP picture in decoding order.

In some aspects, one or more RASL pictures of the second set of one or more leading pictures having a TemporalId greater than the TemporalId threshold value depend on pictures earlier than the IRAP picture in decoding order.

In some aspects, the method, apparatuses, and computer readable medium described above for encoding video data may further comprise signaling the TemporalId threshold value in the video bitstream.

In some aspects, the first set of one or more leading pictures having a TemporalId less than or equal to the TemporalId threshold value are usable as reference for inter-prediction for one or more trailing pictures associated with the IRAP picture. In some examples, the method, apparatuses, and computer readable medium described above for encoding video data may further comprise signaling in the video bitstream an identification identifying the IRAP picture as an IRAP picture that allows the one or more trailing pictures to use the first set of one or more leading pictures as reference for inter-prediction. In some examples, the identification includes a network abstraction layer (NAL) unit type for the IRAP picture other than an instantaneous decoding refresh (IDR) type, a clean random access (CRA) type, and a broken link access (BLA) type. In some aspects, the method, apparatuses, and computer readable medium described above for encoding video data may further comprise signaling at least one or more of a TemporalId for each of the one or more trailing pictures or a cardinality of the one or more trailing pictures, wherein the one or more trailing pictures are arranged in output order according to the TemporalId of each of the one or more trailing pictures. In some aspects, the TemporalId for each of the one or more trailing pictures or the cardinality of the one or more trailing pictures is signaled in a header of the IRAP picture or in a parameter set. In some aspects, the method, apparatuses, and computer readable medium described above for encoding video data may further comprise signaling an identification of the one or more trailing pictures using a NAL unit type.

In some aspects, the second set of one or more leading pictures having a TemporalId greater than the TemporalId threshold value are usable as reference for inter-prediction for one or more trailing pictures associated with the IRAP picture. In some examples, the method, apparatuses, and computer readable medium described above for encoding video data may further comprise signaling in the video bitstream an identification identifying the IRAP picture as an IRAP picture that allows the one or more trailing pictures to use the second set of one or more leading pictures as reference for inter-prediction. In some aspects, the method, apparatuses, and computer readable medium described above for encoding video data may further comprise signaling at least one or more of a TemporalId for each of the one or more trailing pictures or a cardinality of the one or more trailing pictures, wherein the one or more trailing pictures are arranged in output order according to the TemporalId of each of the one or more trailing pictures. In some aspects, the TemporalId for each of the one or more trailing pictures or the cardinality of the one or more trailing pictures is signaled in a header of the IRAP picture or in a parameter set. In some aspects, the method, apparatuses, and computer readable medium described above for encoding video data may further comprise signaling an identification of the one or more trailing pictures using a NAL unit type.

In some aspects, a set of pictures preceding the IRAP picture in both output order and decoding order are usable as reference for inter-prediction for one or more trailing pictures associated with the IRAP picture. In some examples, the method, apparatuses, and computer readable medium described above for encoding video data may further comprise signaling in the video bitstream an identification identifying the IRAP picture as an IRAP picture that allows the one or more trailing pictures to use the set of pictures as reference for inter-prediction. In some aspects, the method, apparatuses, and computer readable medium described above for encoding video data may further comprise signaling at least one or more of a TemporalId for each of the one or more trailing pictures or a cardinality of the one or more trailing pictures, wherein the one or more trailing pictures are arranged in output order according to the TemporalId of each of the one or more trailing pictures. In some aspects, the TemporalId for each of the one or more trailing pictures or the cardinality of the one or more trailing pictures is signaled in a header of the IRAP picture or in a parameter set. In some aspects, the method, apparatuses, and computer readable medium described above for encoding video data may further comprise signaling an identification of the one or more trailing pictures using a NAL unit type.

According to at least one other example, a method of decoding an encoded video bitstream to obtain video data is provided that comprises accessing an encoded video bitstream. The encoded video bitstream includes an intra random access point (IRAP) picture, a set of one or more random access decodable leading (RADL) pictures having a temporal identifier (TemporalId) less than or equal to a TemporalId threshold value, and a set of one or more random access skipped leading (RASL) pictures having a TemporalId greater than the TemporalId threshold value. The method further comprises decoding the encoded video bitstream to obtain the video data.

In another example, an apparatus is provided that includes a memory configured to store video data and a processor. The processor is configured to and can access an encoded video bitstream. The encoded video bitstream includes an intra random access point (IRAP) picture, a set of one or more random access decodable leading (RADL) pictures having a temporal identifier (TemporalId) less than or equal to a TemporalId threshold value, and a set of one or more random access skipped leading (RASL) pictures having a TemporalId greater than the TemporalId threshold value. The processor is further configured to and can decode the encoded video bitstream to obtain the video data.

In another example, a computer readable medium is provided having stored thereon instructions that when executed by a processor perform a method that includes: accessing an encoded video bitstream, the encoded video bitstream including an intra random access point (IRAP) picture, a set of one or more random access decodable leading (RADL) pictures having a temporal identifier (TemporalId) less than or equal to a TemporalId threshold value, and a set of one or more random access skipped leading (RASL) pictures having a TemporalId greater than the TemporalId threshold value; and decoding the encoded video bitstream to obtain the video data.

In another example, an apparatus is provided that includes means for accessing an encoded video bitstream. The encoded video bitstream includes an intra random access point (IRAP) picture, a set of one or more random access decodable leading (RADL) pictures having a temporal identifier (TemporalId) less than or equal to a TemporalId threshold value, and a set of one or more random access skipped leading (RASL) pictures having a TemporalId greater than the TemporalId threshold value. The apparatus further comprises means for decoding the encoded video bitstream to obtain the video data.

In some aspects, the IRAP picture is a clean random access (CRA) picture.

In some aspects, the set of one or more RADL pictures and the set of one or more RASL pictures are arranged in an output order according to temporal identifiers of the one or more RADL pictures and the one or more RADL pictures, the one or more RADL pictures having a lower TemporalId than the one or more RASL pictures.

In some aspects, the set of one or more RADL pictures and the set of one or more RASL pictures are arranged in an alternating output order.

In some aspects, the video data is part of a video representation. In such aspects, the method, apparatuses, and computer readable medium described above for decoding an encoded video bitstream may further comprise: switching to the video representation at the IRAP picture; discarding the set of one or more RASL pictures; and outputting the video representation using a reduced set of one or more temporal sub-layers when the set of one or more RASL pictures is discarded. In some aspects, the method, apparatuses, and computer readable medium described above for decoding an encoded video bitstream may further comprise: decoding one or more trailing pictures associated with the IRAP picture; and outputting the video representation using an increased set of temporal sub-layers when the one or more trailing pictures are decoded.

In some aspects, the method, apparatuses, and computer readable medium described above for decoding an encoded video bitstream may further comprise decoding the set of one or more RADL pictures using inter-prediction without referring to pictures earlier than the IRAP picture in decoding order, wherein the set of one or more RADL pictures do not depend on the pictures earlier than the IRAP picture in decoding order.

In some aspects, the method, apparatuses, and computer readable medium described above for decoding an encoded video bitstream may further comprise decoding the set of one or more RASL pictures using inter-prediction by referring to pictures earlier than the IRAP picture in decoding order.

In some aspects, the method, apparatuses, and computer readable medium described above for decoding an encoded video bitstream may further comprise: determining that pictures earlier than the IRAP picture in decoding order are not available as reference for inter-prediction; and discarding the set of one or more RASL pictures.

In some aspects, the method, apparatuses, and computer readable medium described above for decoding an encoded video bitstream may further comprise performing inter-prediction of one or more trailing pictures associated with the IRAP picture using at least one of the RADL pictures as reference.

In some aspects, the method, apparatuses, and computer readable medium described above for decoding an encoded video bitstream may further comprise performing inter-prediction of one or more trailing pictures associated with the IRAP picture using at least one of the RASL pictures as reference.

In some aspects, the method, apparatuses, and computer readable medium described above for decoding an encoded video bitstream may further comprise performing inter-prediction of one or more trailing pictures associated with the IRAP picture using a set pictures preceding the IRAP picture in both output order and decoding order.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 7 illustrates an example of a process of decoding an encoded video bitstream, in accordance with some examples.

DETAILED DESCRIPTION

Figure 1:
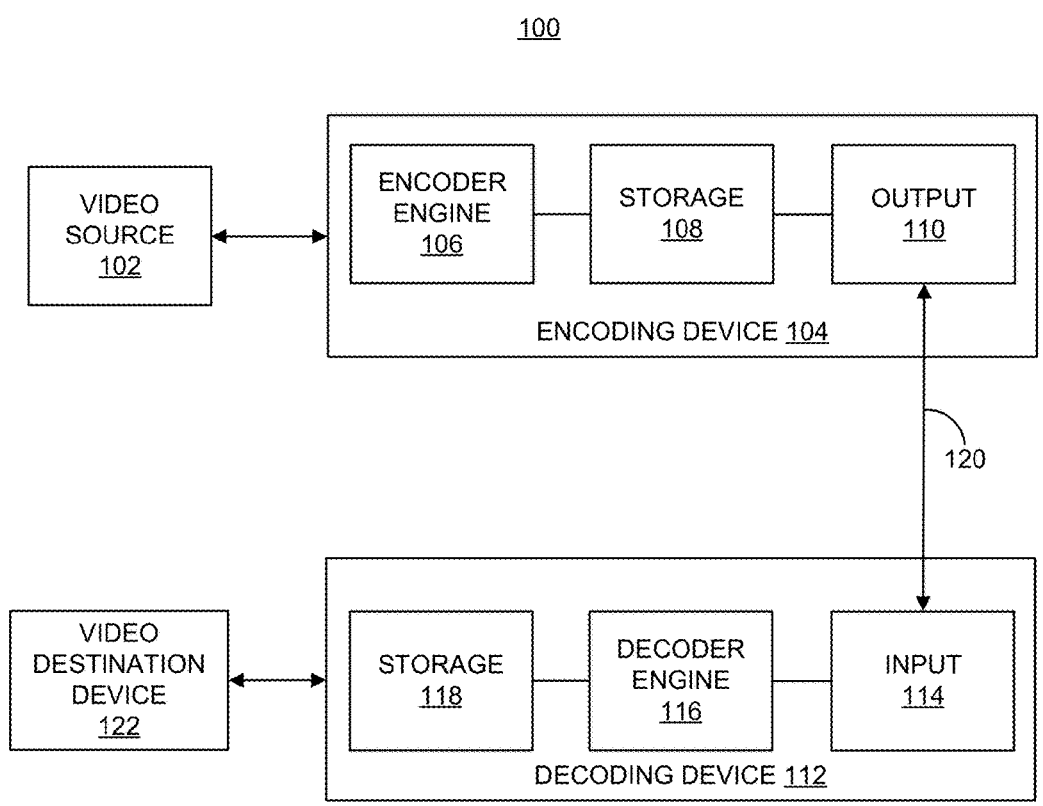
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality.

Several systems and methods of video coding using video encoders, decoders, and other coding processing devices are described herein. In some examples, one or more systems and methods of video coding are described for providing improved video stream switching and random access. For example, currently designated random access point pictures (e.g., open GOP IRAP pictures, such as CRA pictures or BLA pictures) can be re-defined so that leading pictures associated with such a random access point picture are set as RASL pictures or RADL pictures based on temporal identifiers of the pictures. In another example, a new type of random access point picture is defined so that pictures that are subsequent in decoding order to the random access point picture are set with characteristics similar to RASL pictures and RADL pictures according to their temporal identifiers. Details of such systems and methods are described in detail further below.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. A more recent video coding standard, High-Efficiency Video Coding (HEVC), has been finalized by the Joint Collaboration Team on Video Coding (JCT-VC) of ITU-T Video Coding Experts Group (VCEG) and ISO/IEC Moving Picture Experts Group (MPEG). Various extensions to HEVC deal with multi-layer video coding and are also being developed by the JCT-VC, including the multiview extension to HEVC, called MV-HEVC, and the scalable extension to HEVC, called SHVC, or any other suitable coding protocol.

Many embodiments described herein describe examples using the HEVC standard, or extensions thereof. However, the techniques and systems described herein may also be applicable to other coding standards, such as AVC, MPEG, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that is part of a video. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. For intra-block copy prediction, a set of motion parameters (e.g., one or more block vectors, or the like) can also be signaled for each PU and can be used for intra-block copy prediction. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by Intra prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

Intra-picture prediction utilizes the correlation between spatially neighboring samples within a picture. Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, refIdx$_0$ and $\Delta x_1$, $y_1$, refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

Supplemental Enhancement information (SEI) messages can be included in video bitstreams. For example, SEI messages may be used to carry information (e.g., metadata) that is not essential in order to decode the bitstream by the decoding device 112. This information is useful in improving the display or processing of the decoded output (e.g. such information could be used by decoder-side entities to improve the viewability of the content).

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 8. An example of specific details of the decoding device 112 is described below with reference to FIG. 9.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

VCL NAL units include coded picture data forming the coded video bitstream. Various types of VCL NAL units are defined in the HEVC standard, as illustrated in Table A below.

TABLE A

| NAL UNIT TYPE VALUE | NAL UNIT TYPE SYNTAX NAME | CONTENT OF NAL UNIT (PICTURE) | DESCRIPTION OF PICTURE |
|---|---|---|---|
| TRAILING NON-TRAP PICTURES | | | |
| 0 | TRAIL_N | Coded Slice (or slice segment) of a Non-TSA, non-STSA Trailing Picture | Sub-Layer Non-Reference |
| 1 | TRAIL_R | Coded Slice (or slice segment) of a Non-TSA, non-STSA Trailing Picture | Sub-Layer Reference |

TABLE A-continued

| NAL UNIT TYPE VALUE | NAL UNIT TYPE SYNTAX NAME | CONTENT OF NAL UNIT (PICTURE) | DESCRIPTION OF PICTURE |
|---|---|---|---|
| 2 | TSA_N | Coded Slice (or slice segment) of a Temporal Sub-Layer Access (TSA) Picture | Sub-Layer Non-Reference |
| 3 | TSA_R | Coded Slice (or slice segment) of a TSA Picture | Sub-Layer Reference |
| 4 | STSA_N | Coded Slice (or slice segment) of a Step-Wise Temporal Sub-Layer (STSA) Picture | Sub-Layer Non-Reference |
| 5 | STSA_R | Coded Slice (or slice segment) of a STSA Picture | Sub-Layer Reference |
| LEADING PICTURES | | | |
| 6 | RADL_N | Coded Slice (or slice segment) of a Random Access Decodable Leading (RADL) Picture | Sub-Layer Non-Reference |
| 7 | RADL_R | Coded Slice (or slice segment) of a RADL Picture | Sub-Layer Reference |
| 8 | RASL_N | Coded Slice (or slice segment) of a Random Access Skipped Leading (RASL) Picture | Sub-Layer Non-Reference |
| 9 | RASL_R | Coded Slice (or slice segment) of a RASL Picture | Sub-Layer Reference |
| RESERVED | | | |
| 10-15 | RSV | Reserved non-IRAP | |
| 22-23 | RSV | Reserved IRAP | |
| 24-31 | RSV | Reserved non-IRAP | |
| IRAP PICTURES | | | |
| 16 | BLA_W_LP | Coded Slice (or slice segment) of a Broken Link Access (BLA) Picture | May Have Leading Pictures |
| 17 | BLA_W_RADL | Coded Slice (or slice segment) of a BLA Picture | May Have RADL Leading Pictures |
| 18 | BLA_N_LP | Coded Slice (or slice segment) of a BLA Picture | Without Leading Pictures |
| 19 | IDR_W_RADL | Coded Slice (or slice segment) of an Instantaneous Decoding Refresh (IDR) Picture | May Have Leading Pictures |
| 20 | IDR_N_LP | Coded Slice (or slice segment) of an IDR Picture | Without Leading Pictures |
| 21 | CRA | Coded Slice (or slice segment) of a Clean Random Access (CRA) Picture | May Have Leading Pictures |

In a single-layer bitstream, as defined in the first HEVC standard, VCL NAL units contained in an AU have the same NAL unit type value, with the NAL unit type value defining the type of AU and the type of coded picture within the AU. For example, VCL NAL units of a particular AU may include instantaneous decoding refresh (IDR) NAL units (value 19), making the AU an IDR AU and the coded picture of the AU an IDR picture. The given type of a VCL NAL unit is related to the picture, or portion thereof, contained in the VCL NAL unit (e.g., a slice or slice segment of a picture in a VCL NAL unit). Three classes of pictures are defined in the HEVC standard, including leading pictures, trailing pictures, and intra random access (IRAP) pictures. In a multi-layer bitstream, VCL NAL units of a picture within an AU have the same NAL unit type value and the same type of coded picture. For example, the picture that contains VCL NAL units of type IDR is said to be an IDR picture in the AU. In another example, when an AU contains a picture that is an IRAP picture at the base layer (the layer ID equal to 0), the AU is an IRAP AU.

In HEVC, temporal scalability is supported to provide video content at varying frame rates (also referred to as picture rate). Each picture is associated with a TemporalId that indicates the temporal level of the picture. In one illustrative example, a first temporal sub-layer (with TemporalId=0, and referred to as a base temporal sub-layer 0) can provide video content at 15 frames per second (fps), a second temporal sub-layer (with TemporalId=1, and referred to as temporal sub-layer 1) can provide video content at 30 fps, a third temporal sub-layer (with TemporalId=2, and referred to as temporal sub-layer 2) can provide video content at 60 fps, and a fourth temporal sub-layer (with TemporalId=3, and referred to as temporal sub-layer 3) can provide video content at 120 fps. The value of TemporalId for a given picture can be indicated by a field in a NAL unit header.

Figure 2:
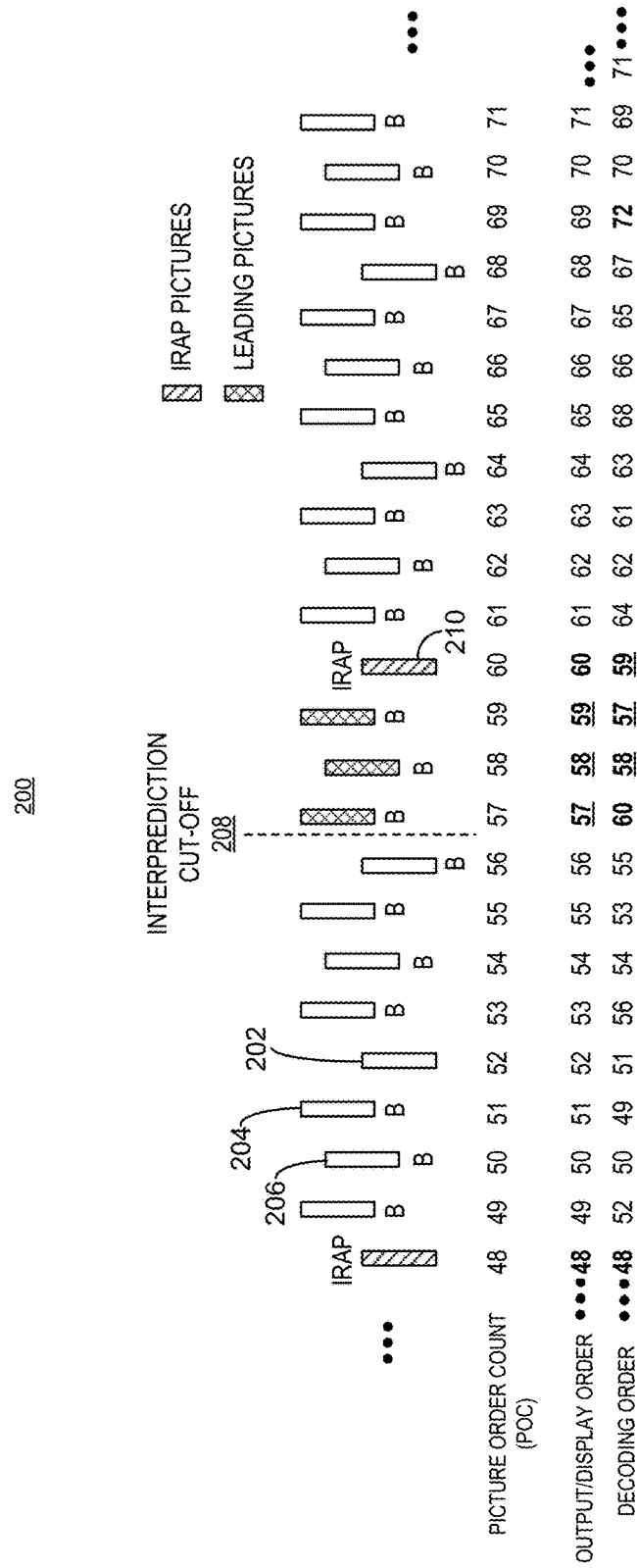
FIG. 2 is an example of pictures in a closed group of pictures (GOP) structure, in accordance with some examples.
Figure 3:
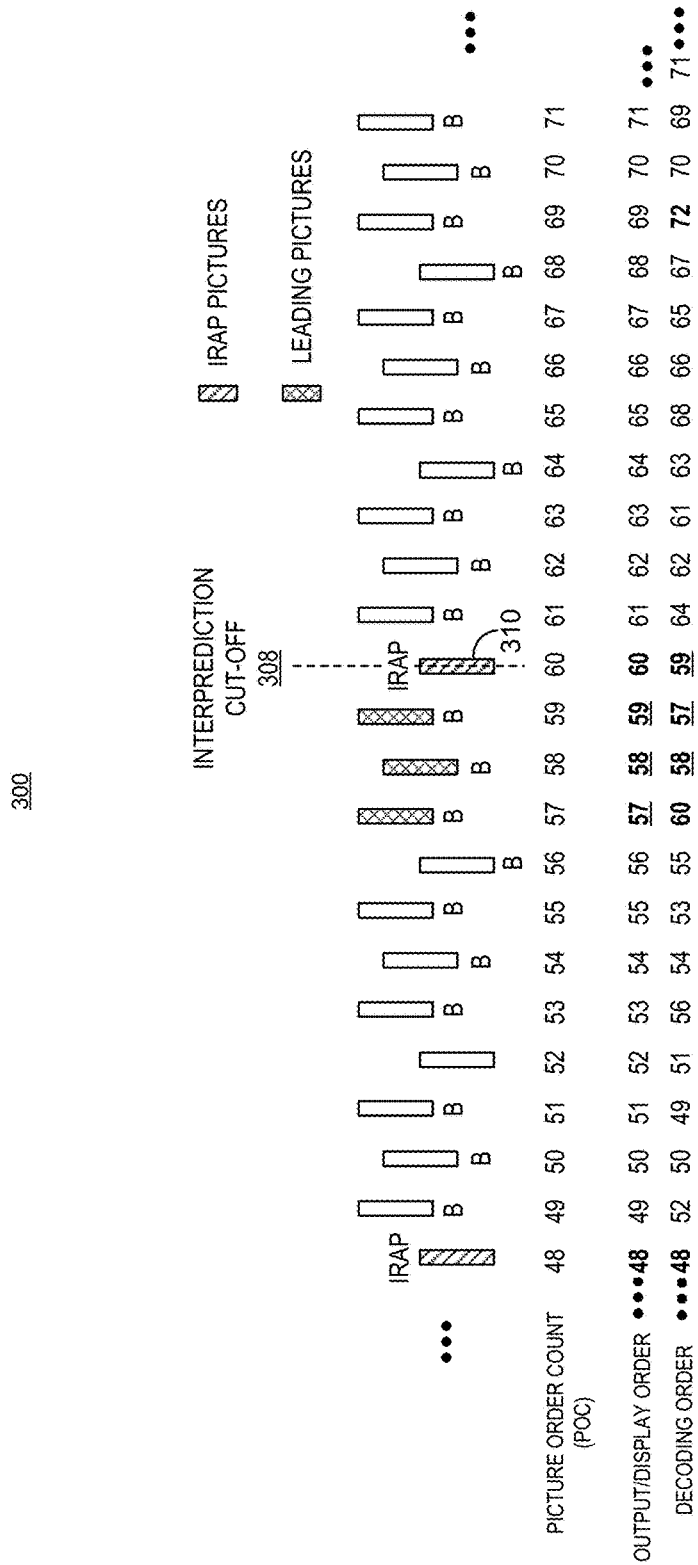
FIG. 3 is an example of pictures in an open GOP structure, in accordance with some examples.

FIG. 2 shows an example of pictures in a video bitstream 200 arranged in output order (also referred to as display order). The bitstream 200 includes three temporal sub-layers, with the height of each picture indicating the temporal sub-layer for which the picture belongs. For example, the bottom pictures (pictures 48, 52, 56, 60, 64, and 68) belong to the base temporal sub-layer (with TemporalId=0). The middle pictures (pictures 50, 54, 58, 62, 66, and 70) belong to the second temporal sub-layer (with TemporalId=1). The top pictures (pictures 49, 51, 53, 55, 57, 59, 61, 63, 65, 67, 69, and 71) belong to the third temporal sub-layer (with TemporalId=2). FIG. 3 shows another example of a video bitstream 300 with three temporal sub-layers.

A constraint is defined that enables the temporal scalability work. The constraint indicates that a higher temporal sub-layer can use the pictures from lower temporal sub-layers for inter-prediction (with a lower TemporalId), but the lower temporal sub-layers shall not refer to any picture from a higher temporal sub-layer for inter-prediction (with a higher TemporalId). For example, a picture in a temporal sub-layer can refer to a reference picture which is in the same temporal sub-layer or in a lower temporal sub-layer. Due to the constraint, pictures with a TemporalId up to a particular value can be decoded without referring to any picture with a greater TemporalId value. Using the video bitstream 200 shown in FIG. 2 as an example, picture 52 is part of the base temporal sub-layer 0, and thus can only use the IRAP picture 48 as reference because the other earlier pictures are all part of higher temporal sub-layers. Similarly, picture 56 can use picture 52 and/or picture 48 as reference for inter-prediction, but cannot use other pictures that are earlier in decoding order. In another example, the picture 54 in the second temporal sub-layer 1 can use any of pictures 48, 50, or 52 as reference. In yet another example, the picture 55 is part of the third temporal sub-layer 2, and can thus use any of pictures 48, 49, 50, 51, 52, 53, or 54 as reference for inter-prediction.

The temporal sub-layers can be scaled up and down to provide different video frame rates. In some examples, the addition of one temporal sub-layer will double the frame rate of the previous temporal sub-layer, and if one temporal sub-layer is removed, the remaining temporal sub-layers will be half of the previous frame rate. For example, if three temporal sub-layers are provided (sub-layers 0, 1, and 2), the pictures of the highest temporal sub-layer 2 can be removed and the pictures of the remaining temporal sub-layers can be decoded to provide half of the maximum frame rate. In another example, the second temporal sub-layer 1 can also be removed in addition to the highest temporal sub-layer 2, leaving only the base temporal sub-layer 0, which can be half of the frame rate that would be achieved if the pictures of temporal sub-layers 0 and 1 were decoded. One of ordinary skill will appreciate that other scaling factors can be used in various implementations.

In one illustrative example, the base temporal sub-layer 0 is at a frame rate of 30 fps, the second temporal sub-layer 1 is at a frame rate of 60 fps, and the third temporal sub-layer 2 is at a frame rate of 120 fps. In this example, when all pictures are decoded and output by a media player, the highest frame rate of 120 fps is achieved. In another example, a media player may decode and output the pictures of the base sub-layer 0 and the second sub-layer 1, providing output video at a frame rate of 60 fps. For instance, all of the pictures in the third temporal sub-layer (sub-layer 2) can be discarded or ignored, and all pictures in the base and second temporal sub-layers (sub-layers 0 and 1) will still be decodable because these pictures do not have reference to pictures of the temporal sub-layer 2. In yet another example, a media player may decode and output only the pictures of the base temporal sub-layer 0, providing output video at 30 fps. For instance, both the temporal sub-layer 1 and the temporal sub-layer 2 can be discarded or ignored, and only the base temporal sub-layer 0 can be decoded. Such a scenario might occur if a particular decoder, media player, display, or other device can only operate at a frame rate of 30 fps, in which case the decoder may decode only the pictures of the temporal sub-layer 0 and discard or ignore the pictures of the temporal sub-layers 1 and 2. Accordingly, the video bitstream 200 can be decoded and output in a temporally scalable manner.

Figure 4:
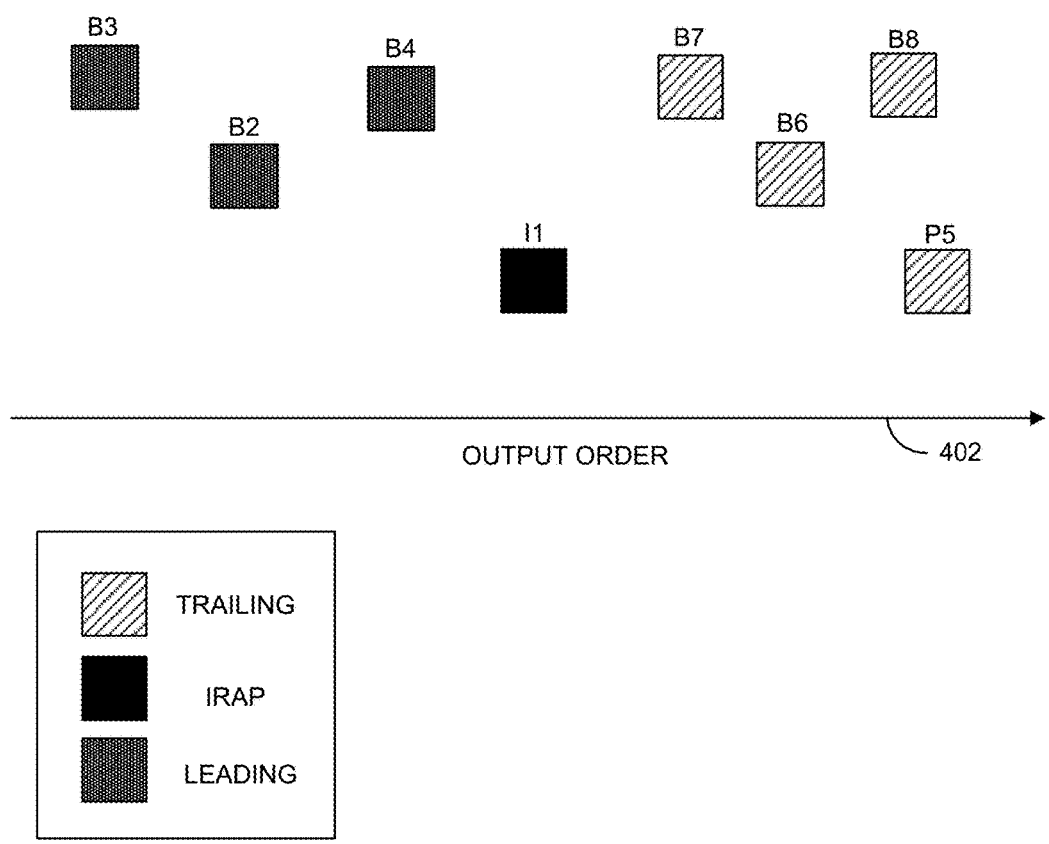
FIG. 4 is an example of pictures of an encoded video bitstream, in accordance with some examples.

Random access and stream switching in HEVC is enabled by the use of intra random access point (IRAP) pictures. As described in more detail below, IRAP pictures include, for example, IDR pictures, CRA pictures, and BLA pictures. FIG. 4 is an example of pictures of an encoded video bitstream including an IRAP picture I1 and leading and trailing pictures associated with the IRAP picture I1. The pictures are linearly displayed in output order in the direction of the arrow 402, and the numbers 1-8 (I1, B2, B3, B4, P5, B6, B7, B8) indicate the decoding order of the pictures. IRAP pictures provide points in a bitstream where decoding can begin. For example, decoding can begin at an IRAP picture so that pictures following the IRAP picture in output order, inclusive, can be output even if all pictures that precede the IRAP picture in decoding order are discarded from the bitstream (e.g., due to bitstream splicing, or the like). Because it is possible to start decoding at an IRAP picture, an IRAP picture is not dependent on any other picture in the bitstream. For example, IRAP pictures belong to temporal sub-layer 0 and are coded without using content of any other pictures as reference data (e.g., intra-prediction coding is used). The first picture of a bitstream is an IRAP picture, and other IRAP pictures may also be present in the bitstream. In a multi-layer bitstream, IRAP pictures that have a layer ID greater than 0 (layers other than a base layer) may use inter-layer prediction. For example, the IRAP pictures may use inter-layer prediction based on pictures that belong to the same access unit and have lower layer ID.

Pictures B2, B3, and B4 include leading pictures of the IRAP picture I1. A leading picture is a picture that follows an IRAP picture in decoding order, but precedes the IRAP picture in output order. As illustrated in FIG. 4, leading pictures B2, B3, and B4 are after IRAP picture I1 in decoding order, and come before the IRAP picture I1 in output order. In some embodiments, leading pictures use one of the leading picture NAL Unit types 6-9 shown in Table A above.

Pictures P5, B6, B7, and B8 include trailing pictures of the IRAP picture I1. A trailing picture is a picture that follows an IRAP picture in decoding order and in output order. As illustrated in FIG. 4, trailing pictures P5, B6, B7, and B8 follow the IRAP picture I1 in decoding order and also in output order. Trailing pictures use one of the trailing picture NAL Unit types 0-5 shown in Table A above.

Leading pictures and trailing pictures are associated with the closest IRAP picture in decoding order (picture I1 in FIG. 4). In some embodiments, the decoding order of an IRAP picture and its associated trailing and leading pictures is defined based on certain conditions on leading and trailing pictures. For example, trailing pictures can refer to an associated IRAP picture and other trailing pictures of the same IRAP picture for inter-prediction. Trailing pictures associated with an IRAP picture do not depend on any leading pictures, and also do not depend on any trailing pictures of previous IRAP pictures. Leading pictures associated with an IRAP picture precede trailing pictures (in decoding order) that are associated with the same IRAP picture. Based on these conditions, and similar other conditions that are not listed here, the decoding order of the IRAP picture I1 and its associated trailing and leading pictures is the IRAP picture I1, followed by the leading pictures B2, B3, B4, followed by the trailing pictures P5, B6, B7, B8.

Various types of trailing pictures, leading pictures, and IRAP pictures are available. For example, trailing pictures include temporal sub-layer access (TSA) pictures, step-wise temporal sub-layer access (STSA) pictures, and ordinary trailing pictures (TRAIL). A TSA picture indicates a temporal sub-layer switching point at which switching can occur up to any higher sub-layer. A STSA picture indicates a temporal sub-layer switching point at which switching can occur to the sub-layer with the same temporal layer identifier as the STSA picture. TSA and STSA pictures belong to temporal sub-layers with temporal identifiers greater than 0. A TRAIL picture can belong to any temporal sub-layer, and does not indicate a temporal sub-layer switching point. In multi-layer bitstreams, STSA pictures that belong to the layer with layer ID greater than 0 can also belong to the temporal sub-layer with temporal sub-layer equal to 0.

Leading picture types include random access decodable leading (RADL) pictures and random access skipped leading (RASL) pictures. A RADL picture is a leading picture that is decodable when random access is performed at the IRAP picture with which the RADL picture is associated. In some embodiments, RADL pictures reference, for inter-prediction purposes, only the associated IRAP picture and other RADL pictures that are also associated with the IRAP picture. A RASL picture is a leading picture that may not be decodable when random access is performed from an associated IRAP picture. A RASL picture is not decodable when a picture that the RASL picture uses for reference precedes the IRAP picture in decoding order. The RASL picture is not decodable because a decoder performing random access at the IRAP picture will not decode the picture that precedes the IRAP picture in decoding order, and thus will also not decode the RASL picture. RASL pictures can reference other types of pictures (e.g., IRAP pictures, other RASL pictures, RADL pictures, or the like). In some examples, only RASL pictures can be dependent on other RASL pictures, in which case every picture that depends on a RASL picture is a RASL picture.

As noted above, different types of IRAP pictures are used for coding video data, including Instantaneous Decoding Refresh (IDR) pictures, Clean Random Access (CRA) pictures, and Broken Link Access (BLA) pictures. An IDR picture is an intra-picture (I-picture) that completely refreshes or reinitializes the decoding process at the decoder and starts a new CVS. In some examples, an IDR picture and any picture following the IDR picture in decoding order cannot be dependent on any picture that comes before the IDR picture in decoding order. In some cases, RASL pictures are not allowed to be associated with an IDR picture. A CRA picture is also an I-picture. A CRA picture does not refresh the decoder and does not begin a new CVS, allowing leading pictures (RASL pictures) of the CRA picture to depend on pictures that come before the CRA picture in decoding order. In some examples, a CRA picture may have associated RADL pictures and RASL pictures. Random access may be done at a CRA picture by decoding the CRA picture, leading pictures (RADL pictures) associated with the CRA picture that are not dependent on any picture coming before the CRA picture in decoding order, and all associated pictures that follow the CRA in both decoding and output order. In some cases, a CRA picture may not have associated leading pictures. In the multi-layer case, an IDR or a CRA picture that belongs to a layer with layer ID greater than 0 may be a P-picture or a B-picture, but these pictures can only use inter-layer prediction from other pictures that belong to the same access unit as the IDR or CRA picture, and that have a layer ID less than the layer containing the IDR or CRA picture.

IRAP pictures provide the ability to splice bitstreams together. For example, an encoder, a bitstream editor (or "editor"), a splicer, or other network device may splice bitstreams together using an IRAP picture. Bitstream splicing allows seamless switching from one compressed video bitstream to another compressed video bitstream. For example, splicing occurs by replacing a first IRAP AU and all subsequent AUs of a first compressed bitstream with a second IRAP AU and subsequent AUs of a second compressed bitstream. IDR or CRA pictures can be used for splicing compressed video bitstreams (in addition to random access, as previously described). For example, the first and second IRAP AUs may include CRA pictures. In some embodiments, IDR pictures can be used for splicing compressed video bitstreams. In some cases, it is not necessary that the first AU should contain an IRAP picture. In multi-layer bitstreams, splicing can occur when the second AU contains an IRAP picture that belongs to a base layer.

In some cases, after splicing occurs, a RASL picture that follows a CRA picture in decoding order may not be decodable in the event the RASL picture references one or more pictures that are no longer in the bitstream after splicing. In some examples, an encoder, editor, splicer, or other device may discard the RASL pictures during splicing. In other examples, a broken link splicing option may be used to indicate that a picture order count timeline, as well as prediction from pictures preceding the CRA picture (in decoding order) that RASL pictures may depend on, are broken when splicing is done.

A third type of IRAP picture, called a BLA picture, can be used as a result of splicing of bitstreams at locations of CRA pictures. For example, a BLA picture can be used to inform a decoder when a splicing operation has occurred so that the decoder can determine whether associated RASL pictures should be decoded. During splicing, the CRA picture in the new bitstream that is used for splicing can be treated as a BLA picture. When broken link splicing is performed, RASL pictures may be kept, and a decoder that comes across such a BLA picture may discard the RASL pictures associated with the BLA picture. In the event the decoder encounters a CRA picture, the decoder will decode RASL pictures associated with the CRA picture. When a decoder comes across a BLA picture or a CRA picture, the decoder will decode all RADL pictures associated with the BLA and CRA pictures, respectively. A BLA picture refreshes or reinitializes the decoding process at the decoder and starts a new CVS. In some embodiments, a BLA picture may be used even when splicing has not occurred.

The encoder, an editor, or other device sending a bitstream to a decoder may indicate to the decoder that CRA picture is to be handled as a BLA picture. In one example, during splicing, the CRA picture in the new bitstream that is used for splicing is renamed as a BLA picture. For instance, a device (editor, splicer, or other network entity) may change a CRA NAL unit type to a BLA NAL unit type. In such an instance, the device changes the bits of the bitstream to change the NAL unit type.

The IRAP pictures follow an open group of picture (GOP) structure or a closed GOP structure. In some cases, IDR pictures follow the closed group of picture (GOP) structure, and CRA pictures follow the open GOP structures. Returning to FIG. 2 and FIG. 3, the difference of IRAP pictures in closed GOP and open GOP structures is illustrated, where the output order and decoding order of each picture are given. FIG. 2 shows IRAP pictures in a closed GOP structure, and FIG. 3 shows IRAP pictures in an open GOP structure. In FIG. 2, the picture 202 with a picture order count (POC) value of 52 follows the picture 204 with a POC value of 51 in output order, meaning that the picture 204 with POC 51 shall be output earlier than the picture 202 with POC value 52. A POC for a picture can be thought of as a unique number assigned for identifying each picture in the bitstream. Further, the picture 202 with POC value 52 precedes, in decoding order, the picture 206 with POC value 50, meaning that the picture 202 with POC value 52 shall be decoded earlier than the picture 206 with POC value 50.

Generally, a picture may use pictures that are decoded earlier as its reference for inter-prediction. For random access to a certain point in a video bitstream, to enable starting of a decoding process from an IRAP picture, there is an inter-prediction cut-off. Pictures after the inter-prediction cut-off point cannot use any picture decoded before the inter-prediction cut-off point as reference. The inter-prediction cut-off point 208 in the closed GOP structure is illustrated in FIG. 2 and the inter-prediction cut-off point 308 in the open GOP structure is illustrated in FIG. 3. Pictures that are in the right hand side of the inter-prediction cut-off points 208 and 308 are not allowed to use pictures in the left hand side of the cut-off points 208 and 308 as reference for inter-prediction. As described above, leading pictures follow an associated IRAP picture in decoding order, but are output earlier than the IRAP picture. As shown in FIG. 2, the pictures with POC values 57, 58 and 59 are leading pictures associated with the IRAP picture 210 (with POC value 60). In the closed GOP structure (FIG. 2), the leading pictures associated with the IRAP picture 210 are not allowed to use pictures that precede the IRAP picture 210 both in decoding and output order (the pictures to the left of the inter-prediction cut-off line 208, which are the pictures with a POC value 56 or less) as reference for inter-prediction. Thus, RASL pictures may not be used in the closed GOP structure (e.g., when IDR IRAP pictures are used).

In an open GOP structure, as shown in FIG. 3, the inter-prediction cut-off point 308 lies on the IRAP picture 310 (with POC value 60). Pictures on the left hand side of the IRAP picture 310 and that follow the IRAP picture in decoding order (the leading pictures with POC values 57, 58, and 59) can still use the IRAP picture 310 as reference for inter-prediction, while pictures on the right hand side of the IRAP picture 302 can also use the IRAP picture 310 as reference for inter-prediction, but cannot use pictures on the left hand side of the IRAP picture 310 as reference. The difference between inter-prediction of leading pictures in closed and open GOP can be seen from the inter-prediction cut-off points 208 and 308 in FIG. 2 and FIG. 3. For example, in the open GOP case of FIG. 3, the leading pictures (POC values 57, 58, 59) can refer to pictures that are earlier in decoding order (and output order) than their associated IRAP picture 310, but this is not allowed in the closed GOP case of FIG. 2. This difference allows the leading pictures in the open GOP case to be coded more efficiently than in the closed GOP case since more pictures are available as reference for inter-prediction. In both the open GOP and closed GOP cases, the leading pictures cannot be used as reference for inter-prediction of the trailing pictures (the pictures that follow the IRAP both in decoding and output order, such as pictures with POC values 61-71 in FIG. 2 and FIG. 3).

There are effects of the inter-prediction cut-off on compression performance, such as when random access is performed. Inter-prediction cut-off is necessary to enable random access features, so that decoding can be restarted from an IRAP picture when random access happens at the IRAP picture, as there is no dependency to earlier pictures in decoding order. In the closed GOP case, as there is a clear inter-prediction cut-off, the decoding is simply restarted with all subsequent pictures (after the IRAP picture that is accessed) in decoding order being decoded. In the open GOP case, the decoding is restarted and the leading pictures that cannot be correctly decoded (e.g., the RASL pictures) are excluded from the decoding process, as they may have dependency to earlier pictures that are not present when random access is performed. However, consequently, inter-prediction cut-off affects the compression efficiency because better temporal prediction may have been achieved if earlier pictures can be used as reference, as described above.

There currently exist inter-prediction constraints for leading pictures. For example, in HEVC, it is constrained that pictures that follow an IRAP picture both in decoding and output order (the trailing pictures) shall not use leading pictures as reference for inter-prediction. This way, it is ensured that trailing pictures can be correctly decoded when decoding starts from the IRAP picture. This reasoning may be arguable, as there may be leading pictures (e.g., RADL pictures) that do not use pictures that precede the IRAP picture both in decoding and output order as reference for inter-prediction.

Another constraint is applied to leading pictures, and stipulates that that the leading pictures that use pictures that precede the IRAP picture both in decoding and output order as reference for inter-prediction (the RASL pictures) shall precede all the RADL pictures in output order. Such a constraint may be motivated by systems that wish to output RADL pictures when random access occurs at an IRAP picture that is associated with the RADL pictures and that prefer that there is no gap, in output order, between any two pictures that are output. For example, when random access occurs at an IRAP picture associated with RASL pictures and RADL pictures, the RASL pictures will be discarded (as described above) and decoding will begin with the IRAP picture and then the RADL pictures.

In adaptive streaming (e.g., dynamic adaptive streaming over HTTP (DASH)), a content item may be available in more than one representation, with each representation providing a different service (e.g., a first representation providing low quality of content, a second representation providing a medium quality of the same content, and a third representation providing a high quality of the same content) with a different bitrate. To enable adaptation from one representation to another representation, each representation is coded in segments (e.g., a sequence of consecutive pictures, with the order of pictures in the segment in decoding order). Each segment typically starts with an IRAP picture.

Figure 5:
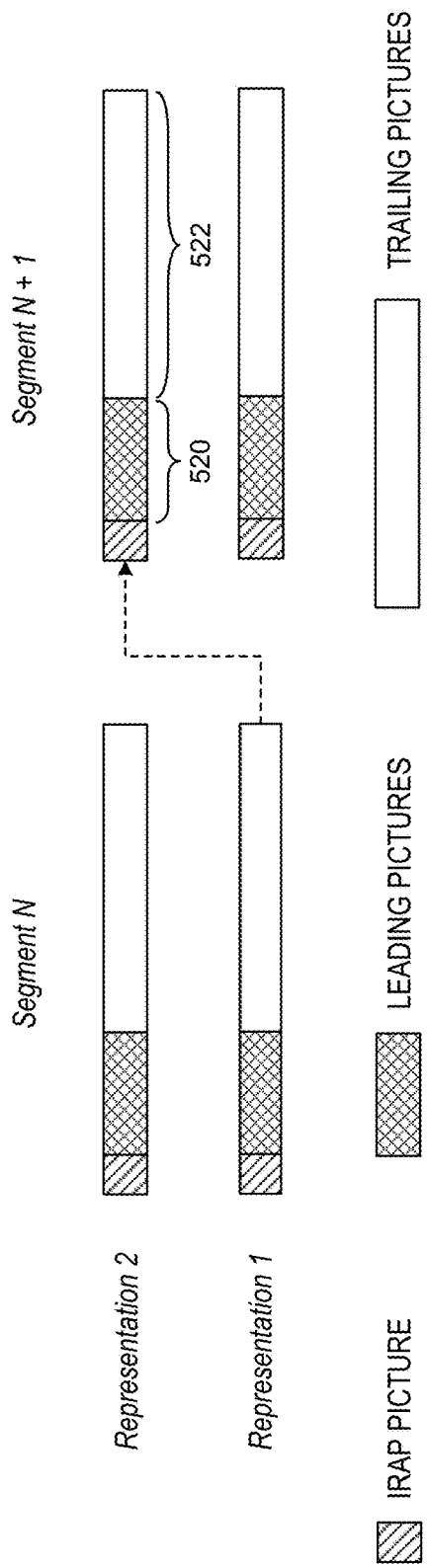
FIG. 5 illustrates an example of switching between representations, in accordance with some examples.

FIG. 5 illustrates an example of switching from one representation to another representation in an adaptive streaming scenario. In one example, representation 1 can include a low quality version of a media content item at a first bitrate, and representation 2 can include a higher quality version of the media content item at a second bitrate that is higher than the first bitrate. The representations 1 and 2 can include a same number of corresponding segments, including segment N and segment N+1. In some examples, after decoding of segment N of representation 1, a decoder can switch to the next segment N+1 of representation 2. Such a switch may occur, for example, when network conditions improve, allowing the decoder to support the higher bitrate of representation 2. Typically, an IRAP picture with an IDR type (which has a closed GOP structure) would be used as the first picture in each segment, as it would allow seamless switching from one representation to another representation because RASL pictures would not be present. For example, when switching to another representation that uses an IDR IRAP picture, every picture in the new segment would be decodable as there is no dependency to pictures in a previous segment.

The use of IDR pictures for starting a segment may not be the optimal choice from a coding efficiency perspective, as RASL pictures that can take advantage of more pictures as reference are not used. Instead of an IDR picture, an IRAP picture with a CRA type (which has an open GOP structure) would allow better coding efficiency due to the use of RASL pictures in addition to RADL pictures. In some cases, however, the use of a CRA picture means that when switching between representation occurs, the RASL pictures in the new segment (segment N+1) would not be decodable. In some scenarios, the RASL pictures must be discarded. In some cases, most or all of the leading pictures associated with a CRA picture are RASL pictures (e.g., in order to achieve a high coding efficiency, or based on other factors), and thus a gap in display of pictures of the new segment N+1 would occur when the RASL pictures are dropped. This gap is made even more apparent due to the constraint noted above that the RASL pictures shall precede all the RADL pictures in output order (display order), causing the RASL pictures that are dropped to be consecutive in output order. In one alternative to discarding the RASL pictures, the RASL pictures in the new segment N+1 of representation 2 can be decoded by referring to pictures in the new segment N+1 from the other representation (representation 1), and may consequently have mismatches. When different spatial resolutions are involved in the different representations, resampling of the pictures used for reference would be needed. Yet another alternative is to have some overlapped decoding by, for example, decoding the starting IRAP picture in the new segment N+1 in representation 1 and its leading pictures, and outputting these leading pictures instead of the leading pictures associated with the starting IRAP picture in the new segment N+1 in representation 2.

Various problems exist in view of the above description. For example, there currently lacks a mechanism to enable representation switching that achieves continuous playback of video content at a switching point for adaptive streaming systems that use open GOP IRAP pictures (e.g., CRA pictures) without decoding mismatch or overlapped decoding. As used herein, a continuous playback refers to when switching happens and some leading pictures must be discarded, the leading pictures can be discarding in a way that no temporal gap or a minimal temporal gap in the video content is perceived (e.g., gap in pictures being output). As described in more detail below, systems and methods described herein distribute the leading pictures that may be discarded within the GOP so that, instead of a set of contiguous pictures in output order being discarded (which leads to a temporal gap), there is only a reduction in temporal rate (e.g., frame/picture rate). Such an open GOP-based representation switching mechanism in adaptive streaming is currently not possible for HEVC or other standard because, for example in HEVC, the order of RASL and RADL pictures are constrained such that all RASL pictures must precede all the RADL pictures associated with the same IRAP in output order. There currently also lacks a mechanism to enable flexible control of the trade-off between coding efficiency and the frame/picture rate of all pictures after randomly accessing a video stream. Such a mechanism using an open GOP structure would enable content providers to flexibly control the trade-off between coding efficiency and the frame/picture rate at switching points.

Various systems and methods are disclosed herein to solve the above problems by providing improved video stream switching and random access. In some examples, leading pictures associated with currently existing open GOP IRAP pictures (e.g., CRA pictures or possibly BLA pictures) are defined as RASL pictures or RADL pictures based on temporal identifiers (TemporalId) of the pictures. Such examples may require re-defining the currently existing GOP IRAP pictures. In some examples, a new type of IRAP picture is defined, in which case pictures associated with the IRAP picture are defined as RASL pictures (or as pictures with similar characteristics as RASL pictures, but labeled differently) or as RADL pictures (or as pictures with similar characteristics as RADL pictures, but labeled differently) based on temporal identifiers (TemporalId) of the pictures. Some of the following systems and methods may be applied independently, and some may be applied in combination. In some implementations, the methods can be implemented by the encoding device 104 and/or the decoding device 112.

In some examples, for open GOP IRAP pictures defined in current standards (e.g., CRA pictures), the leading pictures associated with a GOP IRAP picture and with TemporalIds up to and including a TemporalId threshold value are coded as RADL pictures, while the other associated leading pictures with TemporalIds greater than that particular TemporalId threshold value are coded as RASL pictures. In some examples, the value of the particular TemporalId threshold value can be signalled in the bitstream. For example, the TemporalId threshold value can be signaled in a NAL unit header. In some examples, the value can be signalled in other parts of the bitstream, such as in the slice header, the SEI, or other suitable part of the bitstream that can be used for signalling information.

In some examples, a new type of IRAP pictures is defined that is not defined in current standards. For example, for an IRAP picture of the new type, all subsequent pictures in decoding order with TemporalId up to and including a TemporalId threshold value do not depend on pictures earlier than the IRAP picture in decoding order (and consequently can be correctly decoded without referring to pictures earlier than the IRAP picture in decoding order), which is similar to RADL pictures. Further, all subsequent pictures in decoding order with TemporalId greater than that TemporalId threshold value may depend on pictures earlier than the IRAP picture in decoding order (and consequently may not be correctly decoded without referring to pictures that are earlier than the IRAP picture in decoding order), which is similar to RASL pictures. In some examples, the value of the particular TemporalId threshold value can be signalled in the bitstream. For example, the TemporalId threshold value can be signaled in a NAL unit header. In some examples, the value can be signalled in other parts of the bitstream, such as in the slice header, the SEI, or other suitable part of the bitstream that can be used for signalling information.

In either case, whether currently defined IRAP pictures are re-defined or the new type of IRAP picture is defined, designating leading pictures associated with an open GOP IRAP picture as RASL pictures or RADL pictures based on TemporalIds of the leading pictures allows the RASL and RADL pictures to be distributed within the group of pictures (GOP) of the open GOP IRAP picture so that, instead of discarding a set of contiguous pictures in output order when random access occurs at the IRAP picture (which would lead to a temporal gap in output pictures), a reduction in temporal rate (frame/picture rate) occurs. For example, the pictures with higher temporalIDs (exceeding the temporalId threshold value) are designated as RASL pictures and the pictures with the lower temporalIDs (up to and including the temporalId threshold value) are designed as RADL pictures. While the description herein indicates that leading pictures with TemporalIds up to and including a TemporalId threshold value (that is, less than or equal to) are coded as RADL pictures and that the other associated leading pictures with TemporalIds greater than that particular TemporalId threshold value are coded as RASL pictures, one of ordinary skill will appreciate that leading pictures with TemporalIds that are less than the TemporalId threshold can be coded as RADL pictures and that the other associated leading pictures that have TemporalIds greater than or equal to the TemporalId threshold can be coded as RASL pictures.

In one illustrative example, referring to FIG. 3, the temporalId threshold can be set as a temporalId threshold value of 1. The leading pictures of temporal sub-layers 0 and 1 associated with the open GOP IRAP picture (e.g., picture 58 associated with IRAP picture 310 in FIG. 3) will thus be set as RADL pictures, and the pictures of temporal sub-layer 2 (pictures 57 and 59 associated with IRAP picture 310 in FIG. 3) will be set as RASL pictures. Using such a TemporalId-based mechanism, when random access or switching occurs at an open GOP IRAP picture and the RASL pictures associated with the IRAP picture are discarded or not decoded, the result is that the temporal frame rate goes from the frame rate of the temporal sub-layer 2 (e.g., 240 fps) down to the frame rate of the temporal sub-layer 1 (e.g., 120 fps) until the RADL leading pictures are decoded. The frame rate can then go back up to the higher frame rate of the temporal sub-layer 2 once the decoder begins decoding the trailing pictures associated with the IRAP picture (e.g., starting with picture 61). For example, referring to FIG. 5, the frame rate can be reduced to a lower frame rate (e.g., according to a second temporal sub-layer 1) while the leading pictures 520 are decoded (which include only RADL pictures due to the RASL pictures being discarded or otherwise not decoded). The frame rate can be returned to a higher frame rate (e.g., according to a third temporal sub-layer 2) once the trailing pictures 522 begin to be decoded. Accordingly, instead of dropping several consecutive RASL pictures when random access or switching occurs, the RASL pictures that are dropped are alternated with the RADL pictures that are not dropped according to the TemporalID values.

One of ordinary skill will appreciate that any suitable TemporalId threshold can be used, and that the TemporalId threshold can be adjusted based on any given implementation requirement. For example, the TemporalId threshold can be adjusted to a lower TemporalId value to allow for more RASL pictures, which leads to greater compression efficiency. In another example, the TemporalId threshold can be adjusted to a higher TemporalId value to allow more RADL pictures, which may be better for representation switching in adaptive streaming (e.g., due to less leading pictures being dropped and thus a higher frame rate).

In some implementations, one or more of the HEVC constraints described above relating to leading pictures can be removed to accommodate various designs. In some examples, RADL pictures associated with a particular IRAP picture may be used as reference for inter-prediction of trailing pictures associated with the same IRAP picture. For example, when switching or random access occurs at an IRAP picture, the RADL pictures associated with the IRAP picture are not discarded, and thus can be used as reference for inter-prediction of the trailing pictures associated with the IRAP picture. Thus, the constraint that trailing pictures shall not use leading pictures as reference for inter-prediction can be removed for leading pictures, trailing pictures, and associated IRAP pictures that use the TemporalId-based mechanism described above.

Further, using the above-described TemporalID-based designation of RASL and RADL pictures for an open GOP IRAP picture, the order of RADL pictures and RASL pictures associated with the same IRAP pictures are arranged according to TemporalId values of the pictures. In one example of such a design, all of the RADL pictures associated with an IRAP picture shall have a lower TemporalId value than all the RASL pictures associated with the same IRAP picture. In such examples, the constraint that RASL pictures shall precede all the RADL pictures in output order can be removed for leading pictures, trailing pictures, and associated IRAP pictures that use the TemporalId-based mechanism described above. In some examples, when temporal scalability and temporal sub-layers are not used, the RASL and RADL pictures can be arranged such that the order of the RASL and RADL pictures is in alternating output order (e.g., a RASL picture, then a RADL picture, then a RASL picture, and so forth).

Modifications may also be made to trailing pictures. In some examples, to further improve compression efficiency of an open GOP structure, some trailing pictures that are associated with an IRAP picture may use any leading pictures (e.g., RASL pictures or RADL pictures, or both RASL pictures and RADL) and also may use pictures that precede the IRAP picture in output order and decoding order as reference for inter-prediction. Such trailing pictures that can use RASL pictures and pictures that precede the IRAP picture in output order and decoding order as reference for inter-prediction are referred to herein as modified trailing pictures. In one illustrative example, picture set A is a set of trailing pictures associated with an open GOP IRAP picture. In this example, the trailing pictures in the picture set A use RASL pictures associated with the IRAP picture and/or pictures that precede the IRAP picture in both output order and decoding order as reference for their inter-prediction. Accordingly, the trailing pictures in picture set A are modified trailing pictures. Allowing some trailing pictures to refer to leading pictures and/or to pictures that precede the associated IRAP picture in output order and decoding order allows better coding efficiency to be achieved because more reference pictures are available as options for predicting the trailing pictures.

Various general guidelines or constraints can be applied in such examples. For example, an IRAP picture that allows its associated trailing pictures to use its associated RASL pictures and/or pictures that precede the IRAP in both output order and decoding order as reference for their inter-prediction are made to be identifiable (e.g., so the IRAP pictures can be identified by a decoder or other device). For example, as described above, RASL pictures cannot be decoded when random access or switching is performed at an IRAP picture associated with the RASL pictures (e.g., when switching to a different segment in a different representation), and thus the trailing pictures that refer to the RASL pictures must be identifiable so that the trailing pictures can be dropped in addition to the RASL pictures. In some examples, the identification of such IRAP pictures can be done by defining a new type for the IRAP picture. For example, a new NAL unit type can be assigned for such an IRAP picture. In some examples, additional information can be signalled in a header (e.g., slice header, picture header, or other header) of such an IRAP picture.

Further, the pictures that belong to the picture set A should be easily identified. Various techniques for identifying the pictures that belong to the picture set A are provided. For example, a first option can be used when temporal sub-layers (temporal scalability) are used. For the first option, the techniques described above for modifying trailing pictures (allowing trailing pictures to reference leading pictures and pictures that precede the IRAP picture in output order and decoding order for inter-prediction) may be performed only when temporal sub-layers (temporal scalability) are used. In some examples, for the first option, the following signalling mechanism can be performed:

(1) The following information can be signalled in the slice header or picture header of the IRAP picture associated with picture set A:
   (a) The temporalId(s) of pictures in picture set A that are associated with the IRAP picture;
   (b) Cardinality of pictures in picture set A. This can be signalled in term of number of pictures or number of GOP or any means that can be used to infer the number of pictures that belong to picture set A.
(2) Alternatively, the above information can be signalled at a sequence level (e.g., in a sequence parameter set (SPS)) or at a bitstream level (e.g., in a video parameter set (VPS)).

In another example, a second option for identifying the pictures that belong to the picture set A can use a new NAL unit type or picture type. For example, pictures that belong to picture set A are identified with new types (e.g., a NAL unit type or a picture type).

In some examples, a constraint may be applied to the modified trailing pictures that specifies the pictures that belong to the picture set A shall be in the group of pictures (GOP(s)) that immediately follows the IRAP picture. In such examples, trailing pictures associated with the IRAP picture that do not reference leading pictures or pictures that precede the IRAP picture in output order and decoding order will follow the trailing pictures in picture set A (e.g., in output order, in decoding order, or in both output order and decoding order).

In some examples, a constraint may be applied to the modified trailing pictures that specifies the pictures that belong to the picture set A shall not be used as reference for inter-prediction by pictures that do not belong to the picture set A. In such examples, trailing pictures associated with the IRAP picture that do not reference leading pictures or pictures that precede the IRAP picture in output order and decoding order cannot use the trailing pictures in picture set A as reference for inter-prediction. When random access happens and decoding is started from the IRAP picture, pictures that belong to the picture set A shall be excluded from the decoding process.

In some examples, a TemporalId threshold value can also be set for the modified trailing pictures. For example, trailing pictures associated with a GOP IRAP picture that have a TemporalId higher than a TemporalId threshold value are coded as modified trailing pictures (trailing pictures that refer to RASL pictures of the IRAP and/or to pictures that precede the associated IRAP picture in output order and decoding order for inter-prediction), while the other trailing pictures associated with the IRAP picture (having a TemporalId up to and including the particular TemporalId threshold value) are coded as trailing pictures that do not refer to RASL pictures (but may refer to RADL pictures, in some cases) or that do not refer to any leading pictures. Such a TemporalId-based trailing picture designation allows the trailing pictures and modified trailing pictures to be distributed within the group of pictures (GOP) of the open GOP IRAP picture so that, instead of discarding the set of contiguous modified trailing pictures in output order when random access occurs at the IRAP picture (which would lead to a temporal gap in output pictures), a reduction in temporal rate (frame/picture rate) occurs.

In some examples, the TemporalID threshold value used for designating leading pictures as RASL or RADL pictures can be the same TemporalID value as that used for designating trailing pictures. In some examples, the TemporalID threshold value used for designating leading pictures as RASL or RADL pictures can be different than the TemporalID value that is used for designating trailing pictures.

While the description herein indicates that trailing pictures associated with a GOP IRAP picture with TemporalIds up to and including a TemporalId threshold value (that is, less than or equal to) are coded as trailing pictures that do not refer to RASL pictures or that do not refer to any leading pictures, and that the other associated trailing pictures with TemporalIds greater than that particular TemporalId threshold value are coded as modified trailing pictures, one of ordinary skill will appreciate that trailing pictures with TemporalIds that are less than the TemporalId threshold can be coded as trailing pictures that do not refer to RASL pictures or that do not refer to any leading pictures and that the other associated trailing pictures that have TemporalIds greater than or equal to the TemporalId threshold can be coded as modified trailing pictures.

In one illustrative example, referring to FIG. 3, the temporalId threshold for leading pictures and trailing pictures can be set as a temporalId threshold value of 1. The trailing pictures 62, 64, 66, 68, and 70 associated with IRAP 310 can be designated as trailing pictures that refer only to RADL pictures or that do not refer to any leading pictures, while the trailing pictures 61, 63, 65, 67, 69, and 71 can be designated as modified trailing pictures that refer to RASL pictures of the IRAP 310 and/or to pictures that precede the associated IRAP picture 310 in output order and decoding order for inter-prediction. When random access or switching occurs at the IRAP picture 310, the RASL pictures associated with the IRAP picture 310 (e.g., pictures 57 and 59, according to the temporalIds of the pictures 57 and 59 being in the temporal sub-layer 2) and the modified trailing pictures associated with the IRAP picture (e.g., pictures 61, 63, 65, 67, 69, and 71) are discarded or are not decoded. By using a TemporalId threshold value for defining the trailing pictures, when the RASL pictures and modified trailing pictures associated with the IRAP picture 310 are removed, the temporal frame rate goes from the frame rate of the temporal sub-layer 2 (e.g., 240 fps) down to the frame rate of the temporal sub-layer 1 (e.g., 120 fps) because only the pictures of temporal sub-layer 0 and temporal sub-layer 1 are decoded and output.

By designating leading pictures as RASL or RADL pictures based on the TemporalIds of the leading pictures, an open GOP-based representation switching and random access mechanism in adaptive streaming is made possible. Also, by performing one or of the other examples described herein (e.g., TemporalId-based trailing picture designation, applying one or more of the constraints or guidelines described above, removing one or more of the current constraints described above, or the like), such a system can be made even more efficient and productive. For example, the systems and methods described herein enable continuous playback of video content when random access and representation switching is performed using adaptive streaming systems that use open GOP IRAP pictures. As described above, the systems and methods described herein distribute the discarded leading pictures within the group of pictures so that, instead of a set of contiguous pictures in output order being discarded (which leads to a temporal gap), a reduction in temporal rate is experienced. Such a mechanism allows flexible control of the trade-off between coding efficiency and the frame rate at switching points.

Figure 6:
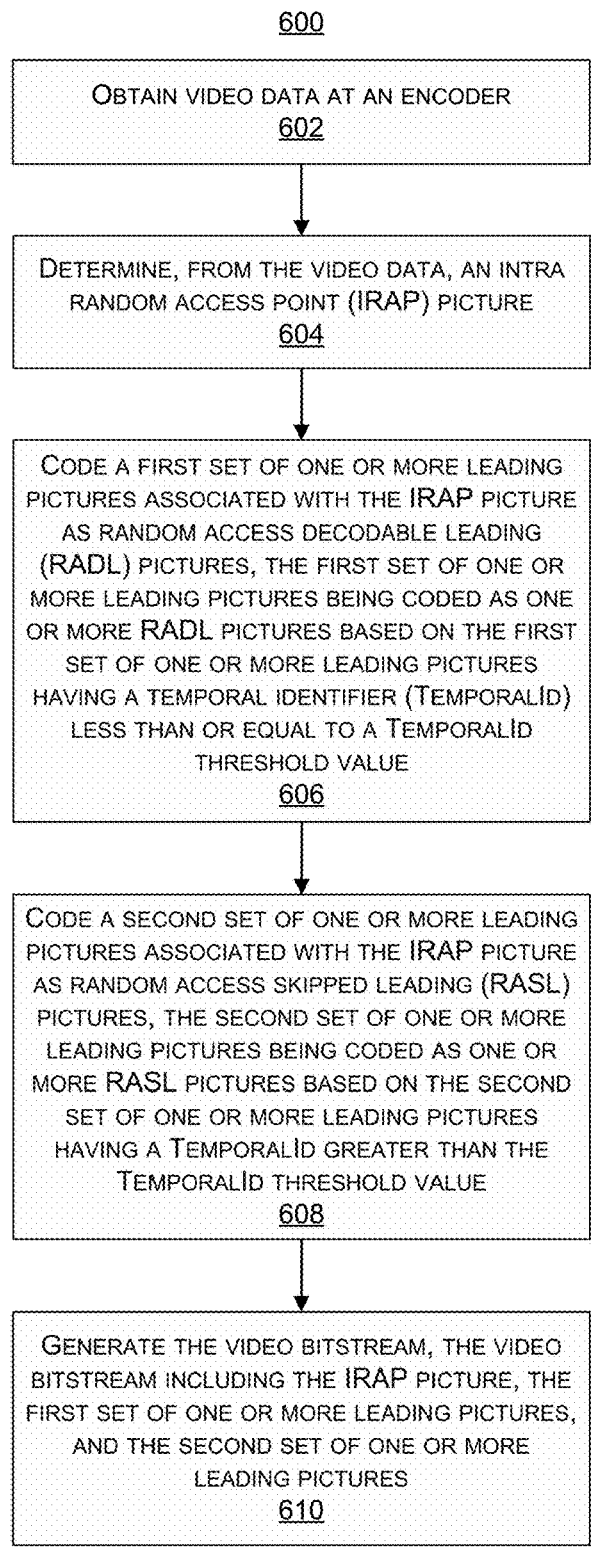
FIG. 6 illustrates an example of a process of encoding video data, in accordance with some examples.

FIG. 6 illustrates another example of a process 600 of encoding video data to generate a video bitstream using one or more of the techniques described herein. At 602, the process 600 includes obtaining video data at an encoder.

At 604, the process 600 includes determining, from the video data, an intra random access point (IRAP) picture. At 606, the process 600 includes coding a first set of one or more leading pictures associated with the IRAP picture as random access decodable leading (RADL) pictures. The first set of one or more leading pictures are coded as one or more RADL pictures based on the first set of one or more leading pictures having a temporal identifier (TemporalId) less than or equal to a TemporalId threshold value. At 608, the process 600 includes coding a second set of one or more leading pictures associated with the IRAP picture as random access skipped leading (RASL) pictures. The second set of one or more leading pictures are coded as one or more RASL pictures based on the second set of one or more leading pictures having a TemporalId greater than the TemporalId threshold value. The leading pictures with the IRAP picture are thus defined as RASL pictures (or RASL-like pictures) or RADL pictures (or RADL-like pictures) based on the TemporalIds of the pictures. In some cases, one of ordinary skill will appreciate that leading pictures with TemporalIds that are less than the TemporalId threshold can be coded as RADL pictures and that the other associated leading pictures that have TemporalIds greater than or equal to the TemporalId threshold can be coded as RASL pictures.

At 610, the process 600 includes generating the video bitstream. The generated video bitstream includes the IRAP picture, the first set of one or more leading pictures, and the second set of one or more leading pictures. In some examples, the process 600 includes signaling the TemporalId threshold value in the video bitstream.

In some examples, the IRAP picture is a clean random access (CRA) picture. For example, the CRA picture currently used under the current HEVC standard can be redefined so that its leading pictures are defined as RADL or RASL pictures based on the TemporalIds of the leading pictures. In some examples, a new type of IRAP picture is defined so that leading pictures associated with the IRAP picture are defined as RASL pictures (or as pictures with similar characteristics as RASL pictures, but labeled differently) or as RADL pictures (or as pictures with similar characteristics as RADL pictures, but labeled differently) based on TemporalIds of the pictures.

In some examples, the process 600 includes arranging the first set of one or more leading pictures and the second set of one or more leading pictures in an output order according to the TemporalId of each leading picture in the first set and the second set. In such examples, the one or more RADL pictures of the first set have a lower TemporalId than the one or more RASL pictures of the second set. In some cases for such examples, the constraint that RASL pictures shall precede all the RADL pictures in output order can be removed for leading pictures, trailing pictures, and associated IRAP pictures that use the TemporalId-based mechanism described herein.

In some examples, the process 600 includes arranging the first set of one or more leading pictures and the second set of one or more leading pictures in an alternating output order. For example, in cases when temporal scalability and temporal sub-layers are not used, the RASL and RADL pictures can be arranged such that the order of the RASL and RADL pictures is in alternating output order (e.g., a RASL picture, then a RADL picture, then a RASL picture, and so forth).

In some examples, the video data is part of a video representation, and the one or more RASL pictures are discarded when a switch to the video representation occurs at the IRAP picture. The video representation is output using a reduced set of one or more temporal sub-layers when the one or more RASL pictures are discarded. Furthermore, the video representation is output using an increased set of temporal sub-layers when one or more trailing pictures associated with the IRAP picture are decoded. In one illustrative example with reference to FIG. 5, a frame rate can be reduced to a lower frame rate (e.g., according to a third temporal sub-layer 2) while the leading pictures 520 are decoded (which include only RADL pictures due to the RASL pictures being discarded or otherwise not decoded). The frame rate can be returned to a higher frame rate (e.g., according to a fourth temporal sub-layer 3) once the trailing pictures 522 begin to be decoded. Using such a mechanism, the RASL pictures that are dropped are alternated with the RADL pictures that are not dropped according to the TemporalID values, rather than dropping several consecutive RASL pictures when random access or switching occurs.

In some examples, the first set of one or more leading pictures having a TemporalId less than or equal to the TemporalId threshold value do not depend on pictures earlier than the IRAP picture in decoding order and are decodable without referring to the pictures earlier than the IRAP picture in decoding order.

In some examples, one or more RASL pictures of the second set of one or more leading pictures having a TemporalId greater than the TemporalId threshold value depend on pictures earlier than the IRAP picture in decoding order.

In some examples, the first set of one or more leading pictures having a TemporalId less than or equal to the TemporalId threshold value are usable as reference for inter-prediction for one or more trailing pictures associated with the IRAP picture. In such examples, the RADL pictures associated with the IRAP picture may be used as reference for inter-prediction of the one or more trailing pictures associated with the IRAP picture. Further, in such examples, the constraint that trailing pictures shall not use leading pictures as reference for inter-prediction can be removed for leading pictures, trailing pictures, and associated IRAP pictures that use the TemporalId-based mechanism described herein.

In examples in which the first set of one or more leading pictures are usable as reference for inter-prediction for the one or more trailing pictures, the process 600 can further include signaling in the video bitstream an identification identifying the IRAP picture as an IRAP picture that allows the one or more trailing pictures to use the first set of one or more leading pictures as reference for inter-prediction. In such examples, the identification can include a network abstraction layer (NAL) unit type for the IRAP picture. The NAL unit type is a new type other than an instantaneous decoding refresh (IDR) type, a clean random access (CRA) type, and a broken link access (BLA) type.

In some examples, the second set of one or more leading pictures having a TemporalId greater than the TemporalId threshold value are usable as reference for inter-prediction for one or more trailing pictures associated with the IRAP picture. Such trailing pictures can be referred to as modified trailing pictures in some implementations. In such examples, the RASL pictures associated with the IRAP picture may be used as reference for inter-prediction of the one or more trailing pictures associated with the IRAP picture. The constraint that trailing pictures shall not use leading pictures as reference for inter-prediction can be removed for leading pictures, trailing pictures, and associated IRAP pictures that use the TemporalId-based mechanism described herein.

In examples in which the second set of one or more leading pictures are usable as reference for inter-prediction for the one or more trailing pictures, the process 600 can further include signaling in the video bitstream an identification identifying the IRAP picture as an IRAP picture that allows the one or more trailing pictures to use the second set of one or more leading pictures as reference for inter-prediction. In such examples, the identification can include a network abstraction layer (NAL) unit type for the IRAP picture. The NAL unit type is a new type other than an instantaneous decoding refresh (IDR) type, a clean random access (CRA) type, and a broken link access (BLA) type.

In some examples, a set of pictures preceding the IRAP picture in both output order and decoding order are usable as reference for inter-prediction for one or more trailing pictures associated with the IRAP picture. Such trailing pictures can be referred to as modified trailing pictures in some implementations. In such examples, the process 600 can further include signaling in the video bitstream an identification identifying the IRAP picture as an IRAP picture that allows the one or more trailing pictures to use the set of pictures as reference for inter-prediction. In such examples, the identification can include a network abstraction layer (NAL) unit type for the IRAP picture. The NAL unit type is a new type other than an instantaneous decoding refresh (IDR) type, a clean random access (CRA) type, and a broken link access (BLA) type.

In any of the examples described above, the process 600 can, in some implementations, include signaling at least one or more of a TemporalId for each of the one or more trailing pictures, a cardinality of the one or more trailing pictures, or other the TemporalId for each of the one or more trailing pictures and the cardinality of the one or more trailing pictures. In such implementations, the one or more trailing pictures are arranged in output order according to the TemporalId of each of the one or more trailing pictures. In some examples, the TemporalId for each of the one or more trailing pictures or the cardinality of the one or more trailing pictures is signaled in a header of the IRAP picture or in a parameter set.

In any of the examples described above, the process 600 can, in some implementations, include signaling an identification of the one or more trailing pictures using a NAL unit type.

In some examples, the process 600 includes coding trailing pictures associated with the IRAP picture that have a TemporalId higher than a trailing picture TemporalId threshold value as modified trailing pictures (trailing pictures that refer to RASL pictures of the IRAP and/or to pictures that precede the associated IRAP picture in output order and decoding order for inter-prediction). In such examples, the process 600 further includes coding trailing pictures associated with the IRAP picture (having a TemporalId up to and including the trailing picture TemporalId threshold value) as trailing pictures that do not refer to RASL pictures (but may refer to RADL pictures, in some cases) or that do not refer to any leading pictures. As described above, such a TemporalId-based trailing picture designation allows the trailing pictures and modified trailing pictures to be distributed within the group of pictures (GOP) of the IRAP picture so that, instead of discarding the set of contiguous modified trailing pictures in output order when random access occurs at the IRAP picture, a reduction in temporal rate (frame/picture rate) occurs. In some examples, the leading picture TemporalID threshold value used for designating leading pictures as RASL or RADL pictures can be the same as the trailing picture TemporalID value used for designating trailing pictures. In some examples, the leading picture TemporalID threshold value can be different than the trailing picture TemporalID value.

FIG. 7 illustrates an example of a process 700 of decoding an encoded video bitstream to obtain video data using one or more of the techniques described herein. At 702, the process 700 includes accessing an encoded video bitstream. The encoded video bitstream includes an intra random access point (IRAP) picture, a set of one or more random access decodable leading (RADL) pictures having a temporal identifier (TemporalId) less than or equal to a TemporalId threshold value, and a set of one or more random access skipped leading (RASL) pictures having a TemporalId greater than the TemporalId threshold value. The leading pictures with the IRAP picture are thus defined as RASL pictures (or RASL-like pictures) or RADL pictures (or RADL-like pictures) based on the TemporalIds of the pictures. In some cases, one of ordinary skill will appreciate that leading pictures with TemporalIds that are less than the TemporalId threshold can be coded as RADL pictures and that the other associated leading pictures that have TemporalIds greater than or equal to the TemporalId threshold can be coded as RASL pictures.

At 704, the process 700 includes decoding the encoded video bitstream to obtain the video data. In some examples, the video bitstream includes the TemporalId threshold value. In some cases, the process 700 includes decoding the TemporalId threshold value from the video bitstream.

In some examples, the IRAP picture is a clean random access (CRA) picture. For example, the CRA picture currently used under the current HEVC standard can be re-defined so that its leading pictures are defined as RADL or RASL pictures based on the TemporalIds of the leading pictures. In some examples, a new type of IRAP picture is defined so that leading pictures associated with the IRAP picture are defined as RASL pictures (or as pictures with similar characteristics as RASL pictures, but labeled differently) or as RADL pictures (or as pictures with similar characteristics as RADL pictures, but labeled differently) based on TemporalIds of the pictures.

In some examples, the set of one or more RADL pictures and the set of one or more RASL pictures are arranged in an output order according to temporal identifiers of the one or more RADL pictures and the one or more RADL pictures. In such examples, the one or more RADL pictures have a lower TemporalId than the one or more RASL pictures. In some cases for such examples, the constraint that RASL pictures shall precede all the RADL pictures in output order can be removed for leading pictures, trailing pictures, and associated IRAP pictures that use the TemporalId-based mechanism described herein.

In some examples, the set of one or more RADL pictures and the set of one or more RASL pictures are arranged in an alternating output order. For example, in cases when temporal scalability and temporal sub-layers are not used, RASL and RADL pictures can be arranged such that the order of the RASL and RADL pictures is in alternating output order.

In some examples, the video data is part of a video representation, and in such examples the process 700 includes switching to the video representation at the IRAP picture, discarding the set of one or more RASL pictures, and outputting the video representation using a reduced set of one or more temporal sub-layers when the set of one or more RASL pictures is discarded. In some examples, the process 700 can further include decoding one or more trailing pictures associated with the IRAP picture, and outputting the video representation using an increased set of temporal sub-layers when the one or more trailing pictures are decoded. In one illustrative example with reference to FIG. 5, a frame rate can be reduced to a lower frame rate (e.g., according to a third temporal sub-layer 2) while the leading pictures 520 are decoded (which include only RADL pictures due to the RASL pictures being discarded or otherwise not decoded). The frame rate can be returned to a higher frame rate (e.g., according to a fourth temporal sub-layer 3) once the trailing pictures 522 begin to be decoded. Using such a mechanism, the RASL pictures that are dropped are alternated with the RADL pictures that are not dropped according to the TemporalID values, rather than dropping several consecutive RASL pictures when random access or switching occurs.

In some examples, the process 700 includes decoding the set of one or more RADL pictures using inter-prediction without referring to pictures earlier than the IRAP picture in decoding order. For example, the set of one or more RADL pictures do not depend on the pictures earlier than the IRAP picture in decoding order.

In some examples, the process 700 includes decoding the set of one or more RASL pictures using inter-prediction by referring to pictures earlier than the IRAP picture in decoding order. For example, at least one of the set of one or more RASL pictures may depend on pictures earlier than the IRAP picture in decoding order.

In some examples, the process 700 includes determining that pictures earlier than the IRAP picture in decoding order are not available as reference for inter-prediction. For example, random access or stream switching may occur at the IRAP picture, in which case pictures earlier than the IRAP picture in decoding order may not be available as reference. In such examples, the process 700 further includes discarding the set of one or more RASL pictures. When the RASL pictures are discarded, a result can include reducing the frame rate to a lower frame rate while the RADL pictures are decoded. The frame rate can be returned to a higher frame rate once trailing pictures associated with the IRAP picture begin to be decoded.

In some examples, the process 700 includes performing inter-prediction of one or more trailing pictures associated with the IRAP picture using at least one of the RADL pictures as reference. In such examples, the RADL pictures associated with the IRAP picture may be used as reference for inter-prediction of the one or more trailing pictures associated with the IRAP picture. Further, in such examples, the constraint that trailing pictures shall not use leading pictures as reference for inter-prediction can be removed for leading pictures, trailing pictures, and associated IRAP pictures that use the TemporalId-based mechanism described herein.

In examples in which the RADL pictures are usable as reference for inter-prediction for the one or more trailing pictures, the video bitstream can further include an identification identifying the IRAP picture as an IRAP picture that allows the one or more trailing pictures to use RADL pictures as reference for inter-prediction. In such examples, the identification can include a network abstraction layer (NAL) unit type for the IRAP picture. The NAL unit type is a new type other than an instantaneous decoding refresh (IDR) type, a clean random access (CRA) type, and a broken link access (BLA) type.

In some examples, the process 700 includes performing inter-prediction of one or more trailing pictures associated with the IRAP picture using at least one of the RASL pictures as reference. In such examples, the RASL pictures associated with the IRAP picture may be used as reference for inter-prediction of the one or more trailing pictures associated with the IRAP picture. Such trailing pictures can be referred to as modified trailing pictures in some implementations. The constraint that trailing pictures shall not use leading pictures as reference for inter-prediction can be removed for leading pictures, trailing pictures, and associated IRAP pictures that use the TemporalId-based mechanism described herein.

In examples in which the RASL pictures are usable as reference for inter-prediction for the one or more trailing pictures, the video bitstream can further include an identification identifying the IRAP picture as an IRAP picture that allows the one or more trailing pictures to use RASL pictures as reference for inter-prediction. In such examples, the identification can include a network abstraction layer (NAL) unit type for the IRAP picture. The NAL unit type is a new type other than an instantaneous decoding refresh (IDR) type, a clean random access (CRA) type, and a broken link access (BLA) type.

In some examples, the process 700 includes performing inter-prediction of one or more trailing pictures associated with the IRAP picture using a set pictures preceding the IRAP picture in both output order and decoding order. Such trailing pictures can be referred to as modified trailing pictures in some implementations. In such examples, the video bitstream can include an identification identifying the IRAP picture as an IRAP picture that allows the one or more trailing pictures to use the set of pictures as reference for inter-prediction. In such examples, the identification can include a network abstraction layer (NAL) unit type for the IRAP picture. The NAL unit type is a new type other than an instantaneous decoding refresh (IDR) type, a clean random access (CRA) type, and a broken link access (BLA) type.

In any of the examples described above, the process 700 can, in some implementations, include receiving at least one or more of a TemporalId for each of the one or more trailing pictures, a cardinality of the one or more trailing pictures, or other the TemporalId for each of the one or more trailing pictures and the cardinality of the one or more trailing pictures. In such implementations, the one or more trailing pictures are arranged in output order according to the TemporalId of each of the one or more trailing pictures. In some examples, the TemporalId for each of the one or more trailing pictures or the cardinality of the one or more trailing pictures is signaled in a header of the IRAP picture or in a parameter set.

In any of the examples described above, the process 700 can, in some implementations, include receiving an identification of the one or more trailing pictures using a NAL unit type.

In some examples, trailing pictures associated with the IRAP picture that have a TemporalId higher than a trailing picture TemporalId threshold value are coded as modified trailing pictures (trailing pictures that refer to RASL pictures of the IRAP and/or to pictures that precede the associated IRAP picture in output order and decoding order for inter-prediction), while the other trailing pictures associated with the IRAP picture (having a TemporalId up to and including the trailing picture TemporalId threshold value) are coded as trailing pictures that do not refer to RASL pictures (but may refer to RADL pictures, in some cases) or that do not refer to any leading pictures. The trailing pictures and modified trailing pictures can be distributed within the group of pictures (GOP) of the IRAP picture so that, instead of discarding the set of contiguous modified trailing pictures in output order when random access occurs at the IRAP picture, a reduction in temporal rate (frame/picture rate) occurs. In some examples, the leading picture TemporalID threshold value used for designating leading pictures as RASL or RADL pictures can be the same as the trailing picture TemporalID value used for designating trailing pictures. In some examples, the leading picture TemporalID threshold value can be different than the trailing picture TemporalID value.

In some examples, the processes 600 and 700 may be performed by a computing device or an apparatus, such as the system 100 shown in FIG. 1. For example, the process 600 can be performed by the encoding device 104 shown in FIG. 1 and FIG. 8, and the process 700 can be performed by the decoding device 112 shown in FIG. 1 and FIG. 9. In some cases, the computing device or apparatus may include a processor, microprocessor, microcomputer, or other component of a device that is configured to carry out the steps of processes 600 and 700. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data.

Processes 600 and 700 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 600 and 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

Figure 8:
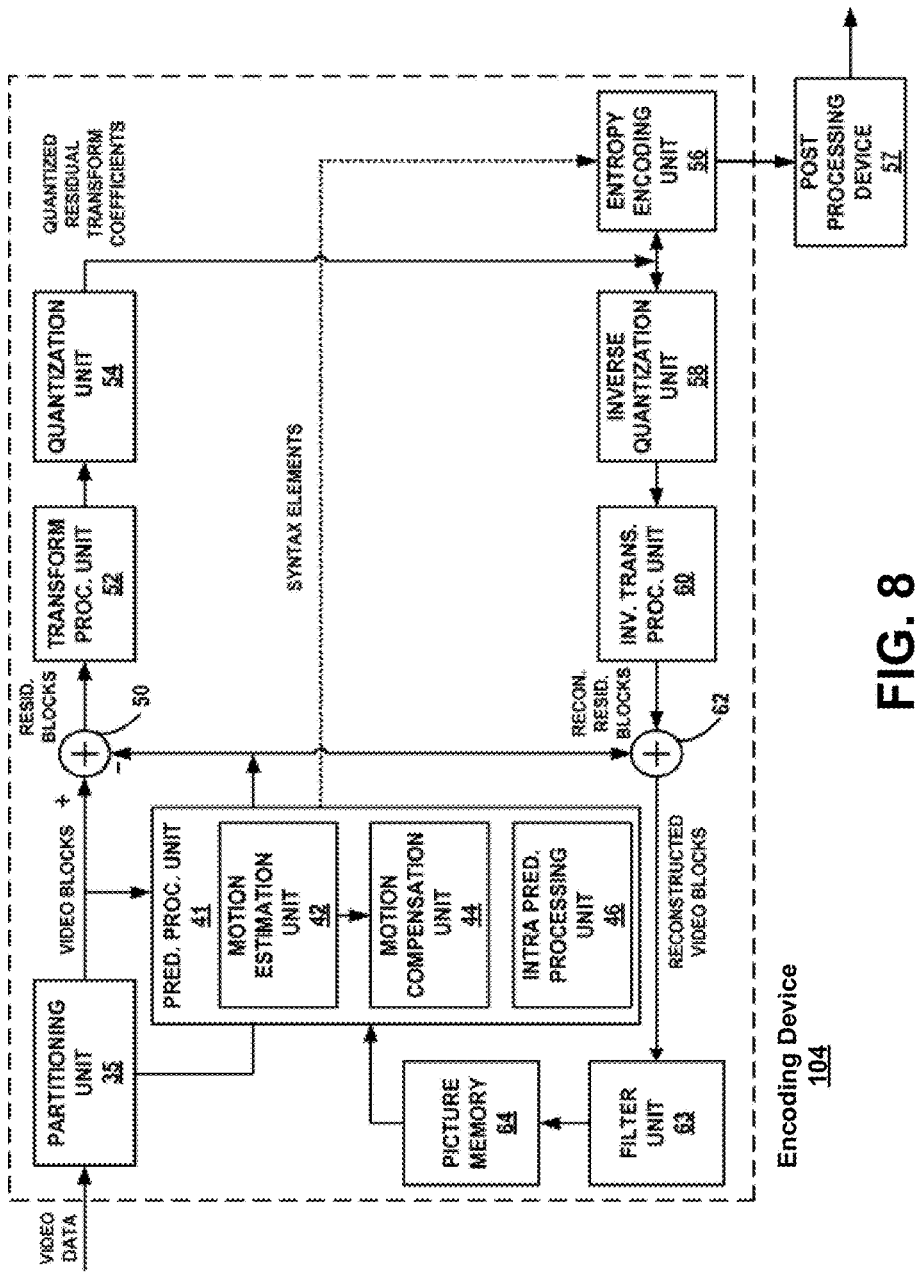
FIG. 8 is a block diagram illustrating an example video encoding device, in accordance with some examples.
Figure 9:
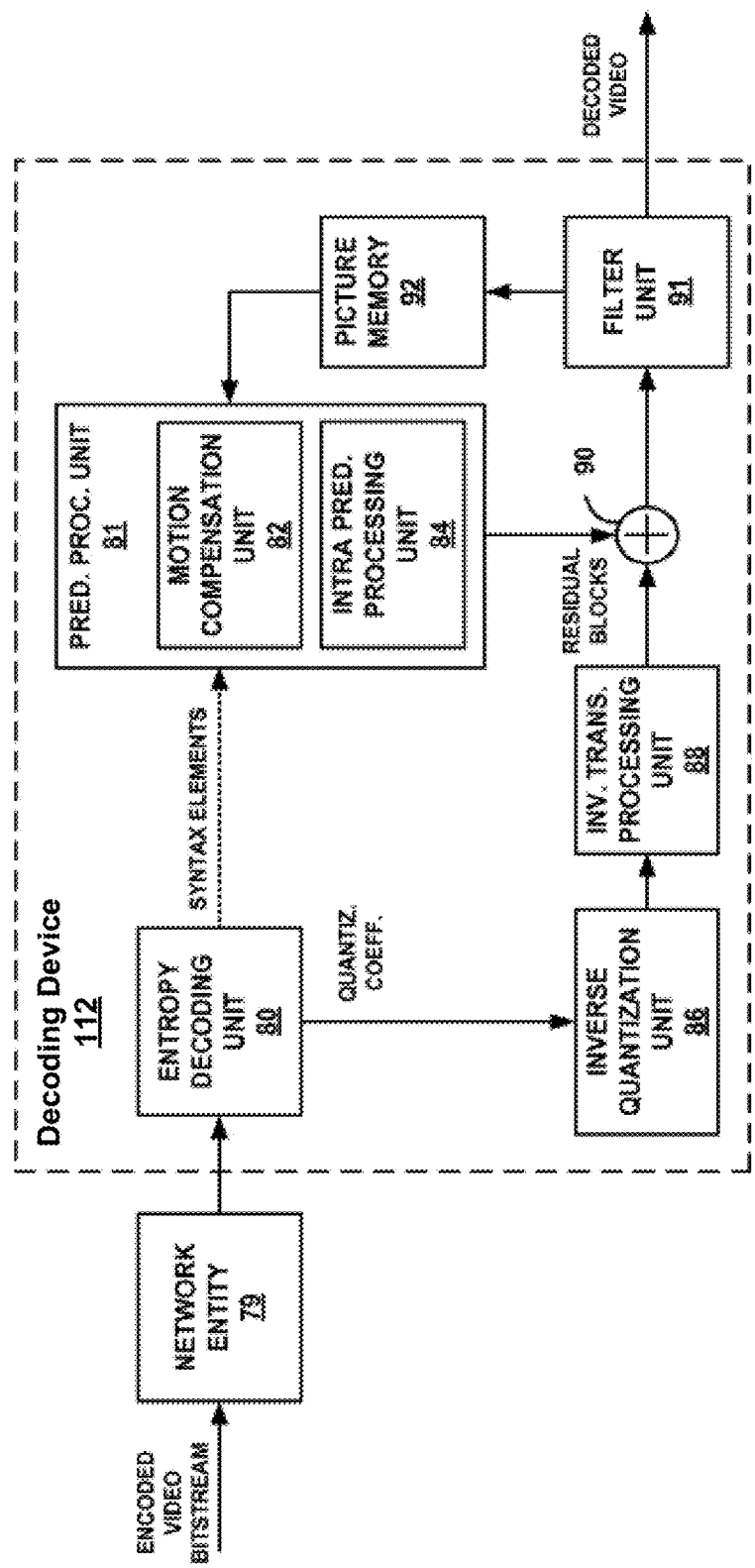
FIG. 9 is a block diagram illustrating an example video decoding device, in accordance with some examples.

Specific details of the encoding device 104 and the decoding device 112 are shown in FIG. 8 and FIG. 9, respectively. FIG. 8 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 8 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 8, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 8 represents an example of a video encoder configured to generate syntax for a encoded video bitstream. The encoding device 104 may, for example, generate VPS, SPS, and PPS parameter sets as described above. The encoding device 104 may perform any of the techniques described herein, including the process described above with respect to FIG. 6. The techniques of this disclosure have generally been described with respect to the encoding device 104, but as mentioned above, some of the techniques of this disclosure may also be implemented by post processing device 57.

FIG. 9 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 8. The decoding device 112 may perform any of the techniques described herein, including the process described above with respect to FIG. 7.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 9 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of encoding video data to generate a video bitstream, the method comprising:
   obtaining video data at an encoder;
   determining, from the video data, an intra random access point (IRAP) picture;
   coding a first set of one or more leading pictures associated with the IRAP picture as random access decodable leading (RADL) pictures, the first set of one or more leading pictures being coded as one or more RADL pictures based on the first set of one or more leading pictures having a temporal identifier (TemporalId) less than or equal to a TemporalId threshold value, wherein leading pictures associated with the IRAP picture are not coded as RADL pictures when the leading pictures have TemporalIds greater than the TemporalId threshold value;
   coding a second set of one or more leading pictures associated with the IRAP picture as random access skipped leading (RASL) pictures, the second set of one or more leading pictures being coded as one or more RASL pictures based on the second set of one or more leading pictures having a TemporalId greater than the TemporalId threshold value; and
   generating the video bitstream, the video bitstream including the IRAP picture, the first set of one or more leading pictures, and the second set of one or more leading pictures.

2. The method of claim 1, wherein the IRAP picture is a clean random access (CRA) picture.

3. The method of claim 1, further comprising arranging the first set of one or more leading pictures and the second set of one or more leading pictures in an output order according to the TemporalId of each leading picture in the first set and the second set, the one or more RADL pictures of the first set having a lower TemporalId than the one or more RASL pictures of the second set.

4. The method of claim 1, further comprising arranging the first set of one or more leading pictures and the second set of one or more leading pictures in an alternating output order.

5. The method of claim 1, wherein the video data is part of a video representation, wherein the one or more RASL pictures are discarded when a switch to the video representation occurs at the IRAP picture, and wherein the video representation is output using a reduced set of one or more temporal sub-layers when the one or more RASL pictures are discarded.

6. The method of claim 5, wherein the video representation is output using an increased set of temporal sub-layers when one or more trailing pictures associated with the IRAP picture are decoded.

7. The method of claim 1, wherein the first set of one or more leading pictures having a TemporalId less than or equal to the TemporalId threshold value do not depend on pictures earlier than the IRAP picture in decoding order and are decodable without referring to the pictures earlier than the IRAP picture in decoding order.

8. The method of claim 1, wherein one or more RASL pictures of the second set of one or more leading pictures having a TemporalId greater than the TemporalId threshold value depend on pictures earlier than the IRAP picture in decoding order.

9. The method of claim 1, further comprising signaling the TemporalId threshold value in the video bitstream.

10. The method of claim 1, wherein the first set of one or more leading pictures having a TemporalId less than or equal to the TemporalId threshold value are usable as reference for inter-prediction for one or more trailing pictures associated with the IRAP picture.

11. The method of claim 10, further comprising signaling in the video bitstream an identification identifying the IRAP picture as an IRAP picture that allows the one or more trailing pictures to use the first set of one or more leading pictures as reference for inter-prediction.

12. The method of claim 11, wherein the identification includes a network abstraction layer (NAL) unit type for the IRAP picture other than an instantaneous decoding refresh (IDR) type, a clean random access (CRA) type, and a broken link access (BLA) type.

13. The method of claim 1, wherein the second set of one or more leading pictures having a TemporalId greater than the TemporalId threshold value are usable as reference for inter-prediction for one or more trailing pictures associated with the IRAP picture.

14. The method of claim 13, further comprising signaling in the video bitstream an identification identifying the IRAP picture as an IRAP picture that allows the one or more trailing pictures to use the second set of one or more leading pictures as reference for inter-prediction.

15. The method of claim 13, further comprising signaling at least one or more of a TemporalId for each of the one or more trailing pictures or a cardinality of the one or more trailing pictures, wherein the one or more trailing pictures are arranged in output order according to the TemporalId of each of the one or more trailing pictures.

16. The method of claim 15, wherein the TemporalId for each of the one or more trailing pictures or the cardinality of the one or more trailing pictures is signaled in a header of the IRAP picture or in a parameter set.

17. The method of claim 13, further comprising signaling an identification of the one or more trailing pictures using a NAL unit type.

18. The method of claim 1, wherein a set of pictures preceding the IRAP picture in both output order and decoding order are usable as reference for inter-prediction for one or more trailing pictures associated with the IRAP picture.

19. The method of claim 18, further comprising signaling in the video bitstream an identification identifying the IRAP picture as an IRAP picture that allows the one or more trailing pictures to use the set of pictures as reference for inter-prediction.

20. An apparatus comprising:
a memory configured to store video data; and
a processor configured to:
   obtain video data at an encoder;
   determine, from the video data, an intra random access point (IRAP) picture;
   coding a first set of one or more leading pictures associated with the IRAP picture as random access decodable leading (RADL) pictures, the first set of one or more leading pictures being coded as one or more RADL pictures based on the first set of one or more leading pictures having a temporal identifier (TemporalId) less than or equal to a TemporalId threshold value, wherein leading pictures associated with the IRAP picture are not coded as RADL pictures when the leading pictures have TemporalIds greater than the TemporalId threshold value;
   code a second set of one or more leading pictures associated with the IRAP picture as random access skipped leading (RASL) pictures, the second set of one or more leading pictures being coded as one or more RASL pictures based on the second set of one or more leading pictures having a TemporalId greater than the TemporalId threshold value; and
   generate a video bitstream, the video bitstream including the IRAP picture, the first set of one or more leading pictures, and the second set of one or more leading pictures.

21. A method of decoding an encoded video bitstream to obtain video data, the method comprising:
   accessing an encoded video bitstream, the encoded video bitstream including an intra random access point (IRAP) picture, a set of one or more random access decodable leading (RADL) pictures having a temporal identifier (TemporalId) less than or equal to a TemporalId threshold value, and a set of one or more random access skipped leading (RASL) pictures having a TemporalId greater than the TemporalId threshold value, wherein leading pictures associated with the IRAP picture are not coded as RADL pictures when the leading pictures have TemporalIds greater than the TemporalId threshold value; and
   decoding the encoded video bitstream to obtain the video data.

22. The method of claim 21, further comprising:
   wherein the set of one or more RADL pictures and the set of one or more RASL pictures are arranged in an output order according to temporal identifiers of the one or more RADL pictures and the one or more RADL pictures, the one or more RADL pictures having a lower TemporalId than the one or more RASL pictures; or
   wherein the set of one or more RADL pictures and the set of one or more RASL pictures are arranged in an alternating output order.

23. The method of claim 21, wherein the video data is part of a video representation, and further comprising:
   switching to the video representation at the IRAP picture;
   discarding the set of one or more RASL pictures; and
   outputting the video representation using a reduced set of one or more temporal sub-layers when the set of one or more RASL pictures is discarded.

24. The method of claim 23, further comprising:
   decoding one or more trailing pictures associated with the IRAP picture; and
   outputting the video representation using an increased set of temporal sub-layers when the one or more trailing pictures are decoded.

25. The method of claim 21, further comprising:
   decoding the set of one or more RADL pictures using inter-prediction without referring to pictures earlier than the IRAP picture in decoding order, wherein the set of one or more RADL pictures do not depend on the pictures earlier than the IRAP picture in decoding order; or
   decoding the set of one or more RASL pictures using inter-prediction by referring to pictures earlier than the IRAP picture in decoding order.

26. The method of claim 21, further comprising:
   determining that pictures earlier than the IRAP picture in decoding order are not available as reference for inter-prediction; and
   discarding the set of one or more RASL pictures.

27. The method of claim 21, further comprising performing inter-prediction of one or more trailing pictures associated with the IRAP picture using at least one of the RADL pictures as reference.

28. The method of claim 21, further comprising performing inter-prediction of one or more trailing pictures associated with the IRAP picture using at least one of the RASL pictures as reference.

29. The method of claim 21, further comprising performing inter-prediction of one or more trailing pictures associated with the IRAP picture using a set pictures preceding the IRAP picture in both output order and decoding order.

30. An apparatus comprising:
a memory configured to store video data; and
a processor configured to:
   access an encoded video bitstream, the encoded video bitstream including an intra random access point (IRAP) picture, a set of one or more random access decodable leading (RADL) pictures having a temporal identifier (TemporalId) less than or equal to a TemporalId threshold value, and a set of one or more random access skipped leading (RASL) pictures having a TemporalId greater than the TemporalId threshold value, wherein leading pictures associated with the IRAP picture are not coded as RADL pictures when the leading pictures have TemporalIds greater than the TemporalId threshold value; and
   decode the encoded video bitstream to obtain the video data.

* * * * *

UNITED STATES PATENT AND TRADEMARK OFFICE
CERTIFICATE OF CORRECTION

PATENT NO. : 10,148,983 B2
APPLICATION NO. : 15/266824
DATED : December 4, 2018
INVENTOR(S) : Fnu Hendry et al.

Page 1 of 1

It is certified that error appears in the above-identified patent and that said Letters Patent is hereby corrected as shown below:

In the Claims

In Column 49, Line 48, in Claim 22, delete "one or more RADL pictures and the one or more RADL pictures, the one or more RADL pictures" and insert -- the one or more RADL pictures and the one or more RASL pictures --, therefor.

In Column 50, Line 38, in Claim 29, delete "set pictures" and insert -- set of pictures --, therefor.

Signed and Sealed this
Nineteenth Day of February, 2019

Andrei Iancu
*Director of the United States Patent and Trademark Office*